(12) United States Patent
Mabuchi et al.

(10) Patent No.: US 7,525,205 B2
(45) Date of Patent: Apr. 28, 2009

(54) ELECTRIC POWER GENERATOR

(75) Inventors: Katsuji Mabuchi, Gifu (JP); Hitoshi Hirano, Nishinomiya (JP); Yoshiki Murayama, Anpachi-gun (JP); Naoteru Matsubara, Ichinomiya (JP); Hideaki Miyamoto, Ogaki (JP); Makoto Izumi, Gifu (JP); Kazunari Honma, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/829,377

(22) Filed: Jul. 27, 2007

(65) Prior Publication Data

US 2008/0048521 A1 Feb. 28, 2008

(30) Foreign Application Priority Data

| Jul. 28, 2006 | (JP) | 2006-206763 |
| Aug. 31, 2006 | (JP) | 2006-234965 |
| Jul. 25, 2007 | (JP) | 2007-192713 |
| Jul. 25, 2007 | (JP) | 2007-192716 |

(51) Int. Cl.
*H02P 9/04* (2006.01)
(52) U.S. Cl. .................................. 290/1 R; 307/400
(58) Field of Classification Search .................. 290/1 R
See application file for complete search history.

(56) References Cited

U.S. PATENT DOCUMENTS

| 3,652,932 | A | * | 3/1972 | Sessler et al. ............... 324/72 |
| 3,705,312 | A | * | 12/1972 | Sessler et al. ............... 307/400 |
| 3,736,436 | A | * | 5/1973 | Crites ........................... 307/400 |
| 4,041,446 | A | * | 8/1977 | Liebermann ................. 367/181 |
| 5,590,014 | A | * | 12/1996 | Bushman ...................... 361/225 |
| 5,646,464 | A | * | 7/1997 | Sickafus ................ 310/40 MM |
| 6,127,812 | A | * | 10/2000 | Ghezzo et al. ............... 320/166 |
| 6,230,566 | B1 | * | 5/2001 | Lee et al. .................. 73/514.32 |
| 6,657,442 | B1 | * | 12/2003 | Seppa et al. ................. 324/661 |
| 6,759,591 | B2 | * | 7/2004 | Yoshida et al. .............. 174/520 |
| 6,820,493 | B1 | * | 11/2004 | Bonin ........................... 73/780 |
| 6,833,687 | B2 | * | 12/2004 | Landolt ....................... 320/166 |
| 6,882,455 | B2 | * | 4/2005 | Arima .......................... 359/224 |
| 7,211,923 | B2 | * | 5/2007 | Potter .......................... 310/309 |
| 7,354,787 | B2 | * | 4/2008 | Dunec et al. .................. 438/52 |
| 7,402,449 | B2 | * | 7/2008 | Fukuda et al. ................ 438/53 |

FOREIGN PATENT DOCUMENTS

| JP | 58-029379 A | 2/1983 |
| JP | 02-101972 A | 4/1990 |
| JP | 2002-264618 | 9/2002 |
| JP | 2004-187429 A | 7/2004 |
| JP | 2005-529574 | 9/2005 |
| JP | 3121655 U | 5/2006 |
| JP | 2006-180450 A | 7/2006 |
| JP | 2007-192716 | 9/2008 |
| WO | WO 03/105167 A2 | 12/2003 |

* cited by examiner

*Primary Examiner*—Joseph Waks
(74) *Attorney, Agent, or Firm*—Ditthavong, Mori & Steiner, P.C.

(57) ABSTRACT

An electric power generator capable of using external vibrations in various directions to generate power. A fixed substrate having a surface with a plurality of electret electrodes and a movable substrate having a surface with a movable electrode are spaced from each other. The fixed substrate is fixed in the electric power generator. Spring driving bodies support the movable substrate so that the movable substrate elastically moves in any direction within an XY plane when receiving external vibrations.

19 Claims, 16 Drawing Sheets

X vibration applied

Y vibration applied

ELECTRIC POWER GENERATOR

CROSS-REFERENCE TO RELATED APPLICATIONS

This application is based upon and claims the benefit of priority from prior Japanese Patent Applications No. 2006-206763, filed on Jul. 28, 2006, No. 2006-234965, filed on Aug. 31, 2006, No. 2007-192713, filed on Jul. 25, 2007, and No. 2007-192713, filed on Jul. 25, 2007, No. 2007-192716, filed on Jul. 25, 2007, the entire contents of which are incorporated herein by reference.

BACKGROUND OF THE INVENTION

The present invention relates to an electric power generator, and more particularly, to an electrostatic induction type electric power generator that uses electret materials.

A compact electrostatic induction type electric power generator is known in the prior art. The electrostatic induction type electric power generator generates electric power by applying charges to electrodes of a variable capacitor, using the charges to generate Coulomb attraction force between opposing electrodes, and converting vibration energy into electric energy, in which the vibration energy is generated by vibrating a vibrator vibrates against the Coulomb attraction force.

FIG. 9 is a schematic cross-sectional view of a conventional electrostatic induction type electric power generator disclosed in Japanese Laid-Open National Phase Patent Publication No. 2005-529574. The electrostatic induction type electric power generator is a so-called electret electric power generator in which a first substrate 407 including conductive surface electrodes 411 and a second substrate 405 including electret material electrodes 409 are spaced from each other by a predetermined distance. The second substrate 405, which includes the electret material electrodes 409, is fixed and immovable. The first substrate 407 including the conductive surface electrodes 411 is connected to fixtures 417 by springs 419. The springs 419 are connected to two opposite sides of the first substrate 407. The elasticity of the springs 419 enables movement of the first substrate 407 in an X-axis direction 421 and returns the first substrate 407 to a neutral position after such movement. The overlapping area of the electret material electrodes 409, which carries charges, with the opposing conductive surface electrodes 411 increases and decreases as the first substrate 407 vibrates in the X-axis direction. This changes the charge of the conductive surface electrodes 411. The electrostatic induction type electric power generator uses the change in charge as electric energy to generate electric power.

However, in the electrostatic induction type electric power generator of FIG. 9, the substrate 407 vibrations are restricted in directions other than the X-axis direction 421. Thus, the electrostatic induction type electric power generator cannot use external vibrations in directions other than the X-axis direction 421 to generate electric power. Such an electrostatic induction type electric power generator thus cannot generate electric power when, for example, receiving external vibrations in a Y-axis direction, which differs from the X-axis direction 421.

SUMMARY OF THE INVENTION

Accordingly, the present invention provides an electric power generator enabling use of external vibrations in various directions to generate electric power.

One aspect of the present invention is an electric power generator including a first electrode and a second electrode spaced from the first electrode. At least either one of the first electrode and the second electrode includes a film for carrying charge, and at least either one of the first electrode and the second electrode is movable along a first axis on a plane and a second axis on the plane differing from the first axis.

In an embodiment of the present invention, there is provided an electric power generator including a first electrode and a second electrode spaced from the first electrode. At least one of the first electrode and the second electrode is movable in response to vibration along a first axis on a plane, vibration along a second axis on the plane, with the second axis differing from the first axis, and vibration along a third axis on a plane that differs from the plane, with the third axis intersecting the first axis and the second axis.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
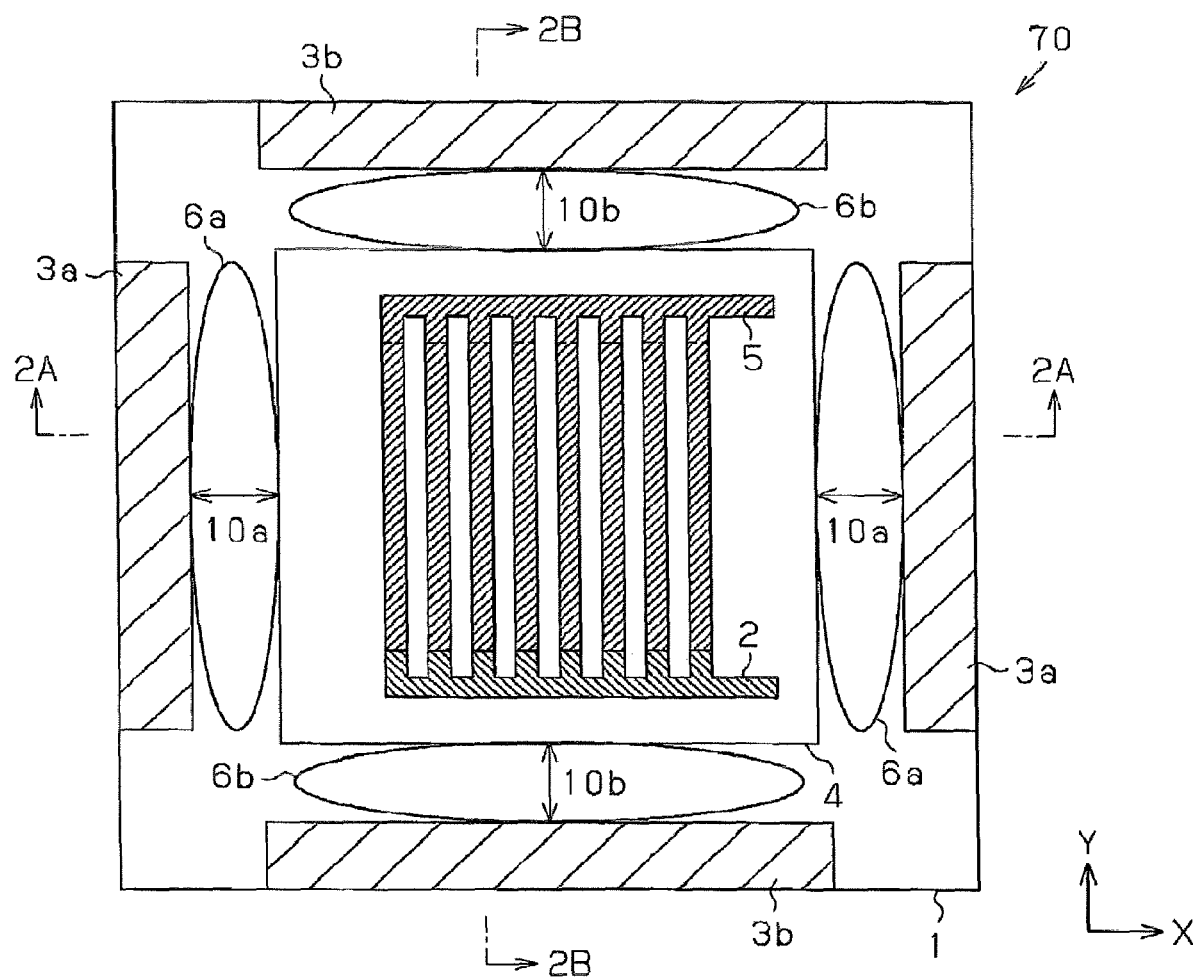
FIG. 1 is a schematic plan view showing an electric power generator according to a first embodiment of the present invention.

An electric power generator according to a first embodiment of the present invention will now be described. In the drawings, like numerals are used for like elements throughout.

Figure 2A:
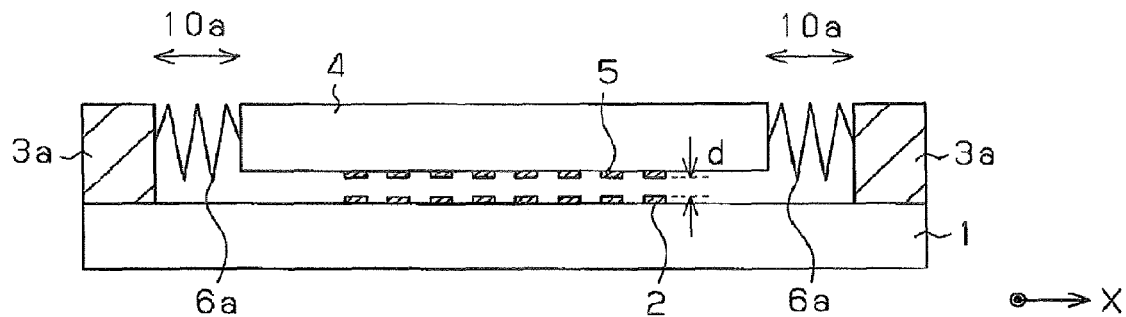
FIG. 2A is a schematic cross-sectional view of the electric power generator taken along line 2A-2A in FIG. 1.
Figure 2B:
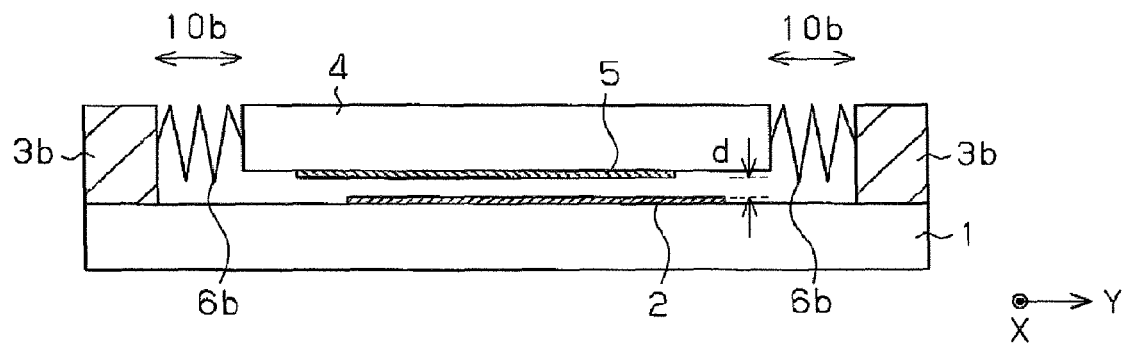
FIG. 2B is a schematic cross-sectional view of the electric power generator taken along line 2B-2B in FIG. 1.

The electric power generator 70 of the first embodiment converts vibrations, such as periodic or non-periodic external vibrations received from the ambient environment, into electric energy. Referring to FIGS. 2A and 2B, the electric power generator 70 includes a fixed substrate 1, having a surface including at least one electret electrode 2, and a movable substrate 4, having a surface including at least one movable electrode 5. The electrode 5 faces toward the electrode 2 and is spaced by a predetermined distance d from the electrode 2. The electret electrode 2 includes an electrode covered by an electret film formed from a charge carrying material such as fluorocarbon resin. The charge carrying material that may be used for the electret film may be a high polymer charge carrying material such as polypropylene (PP), polyethylene terephthalate (PET), polyvinyl chloride (PVC), polystyrene (PS), polytetrafluoroethylene (PTFE), tetra fluoro ethylene-perfluoro alkylvinyl ether copolymer (PFA), tetrafluoroethylne-hexafluoropropylene copolymer (FEP), tetrafluoroethylene copolymer (ETFE), polyvinylidene fluoride (PVDF), polychlorotrifluoroethylene (PCTFE), chlorotrifluoroethylene copolymer (ECTFE), and poly vinyl-fluoride (PVF); and an inorganic charge carrying material such as silicon oxide ($SiO_2$) and silicon nitride (SiN).

The electret electrode 2 and the fixed substrate 1 are supported in a fixed state in the electric power generator 70. The movable electrode 5 and the movable substrate 4 are connected to fixtures 3a and 3b arranged on the fixed substrate 1 by elastic members such as spring driving bodies 6a and 6b. As shown in FIG. 1, the spring driving bodies 6a are connected to opposite sides of the movable substrate 4. The elasticity of the spring driving bodies 6a enables the movable substrate 4 to move in an X-axis direction, as indicated by arrow 10a, and return to a neutral position after such movement. Similarly, the elasticity of the spring driving bodies 6b enables the movable substrate 4 to move in a Y-axis direction, which is perpendicular to the X-axis direction, as indicated by arrow 10b and return to a neutral position after such movement. The movable substrate 4 can thus move in any direction along an XY plane by combining the two types of spring driving bodies 6a and 6b.

Figure 3A:
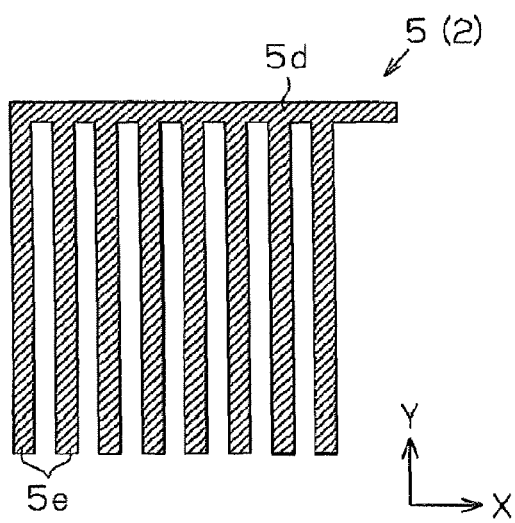
FIG. 3A is a plan view showing the shape of electrodes in the electric power generator of FIG. 1.
Figure 3B:
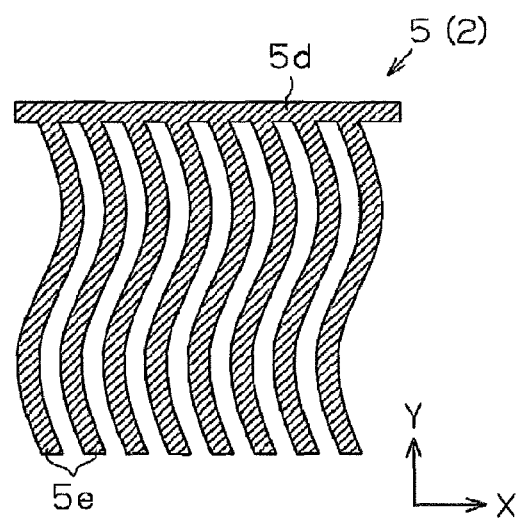
FIG. 3B is a plan view showing a modification of the electrodes of FIG. 3A.

The electret electrode 2 and the movable electrode 5 may be identically shaped. In an example shown in FIG. 3A, the electret electrode 2 and the movable electrode 5 are both comb-shaped and have a common wire 5d extending in the X-axis direction and a plurality of segmented strips 5e extending linearly from the common wire 5d in the Y-axis direction. In the example of FIG. 3B, the strips 5e are undulated. In the example of FIGS. 3A and 3B, the strips of the electret electrode 2 and the strips of the movable electret may have either the same width or different widths. It is preferred that all of the strips in the electrodes of be the same.

The electret electrode 2 is an example of a "first electrode" of the present invention, the electret film is an example of a "film for carrying charges or a permanently charged electret film" of the present invention, the movable electrode 5 is an example of a "second electrode" of the present invention, the X-axis direction is a "first axis direction" of the present invention, and the Y-axis direction is an example of a "second axis direction" of the present invention.

The second axis may intersect the first axis at a predetermined angle. For example, the second axis may intersect the first axis at a right angle or any other angle. The fixtures 3a and 3b may be arranged along the four sides of a square or rectangle, with the first axis intersecting the second axis at a right angle. Alternatively, the fixtures may be arranged along the four sides of a parallelogram or a rhombus, with the first axis intersecting the second axis at an angle other than a right angle.

The operation of the electric power generator 70 will now be discussed.

The movable substrate 4 is located at the neutral position when vibrations are not received. In a state in which the movable substrate 4 is located at the neutral position, the overlapping area of the movable electrode 5 and the electret electrode 2, which carry charges, is referred to as an initial area. In the example shown in FIG. 1, the initial area takes a positive value. However, the initial area may take the value of zero (refer to FIGS. 4 and 5).

When vibrations are applied to the electric power generator 70, for example from the ambient environment, the movable substrate 4 moves. This increases or decreases the overlapping area of the electret electrode 2 and the movable electrode 5 from the initial area. The change in overlapping area varies the charge of the movable electrode 5. The electric power generator 70 uses the varied charge as electric energy to generate electric power. In particular, the movable electrode 5 is movable in any direction in the XY plane since the movable electrode 5 is elastically supported by the elastic members (spring driving bodies 6a) enabling movement of the movable electrode 5 in the X-axis direction (arrow 10a) and the elastic members (spring driving bodies 6b) enabling movement of the movable electrode 5 in the Y-axis direction (arrow 10b). Thus, in addition to the X-axis direction, the electric power generator 70 can use external vibrations having amplitude in a direction other than the X-axis direction to generate electric power.

The electric power generator 70 of the first embodiment of the present invention has the advantages described below.

(1) When external vibrations are applied to the electric power generator 70, in accordance with the direction of the external vibrations, the movable electrode 5 moves in the X-axis direction (arrow 10*a*), the Y-axis direction (10*b*), or a direction obtained by synthesizing the two directions. The overlapping area of the electret electrode 2 and the movable electrode 5 increases or decreases in accordance with the movement of the movable electrode 5. Thus, the electric power generator 70 can generate electric power using external vibrations in the Y-axis direction (arrow 10*b*) in addition to the X-axis direction (arrow 10*a*). More specifically, the electric power generator 70 can use external vibrations in any direction except for a direction that is perpendicular to both X and Y-axis directions. Thus, the power generation efficiency of the electric power generator 70 is high compared to the prior art electric power generator in which movement of the vibrator is limited to one direction (e.g., X-axis direction).

(2) The electret electrode 2 and the movable electrode 5 are both comb-shaped and include the plurality of segmented strips 5*e* extending linearly in the Y-axis direction (arrow 10*b*). Thus, even small external vibrations would greatly change the overlapping. This improves the power generation efficiency with respect to at least the external vibrations in the X-axis direction (arrow 10*a*).

Figure 4:
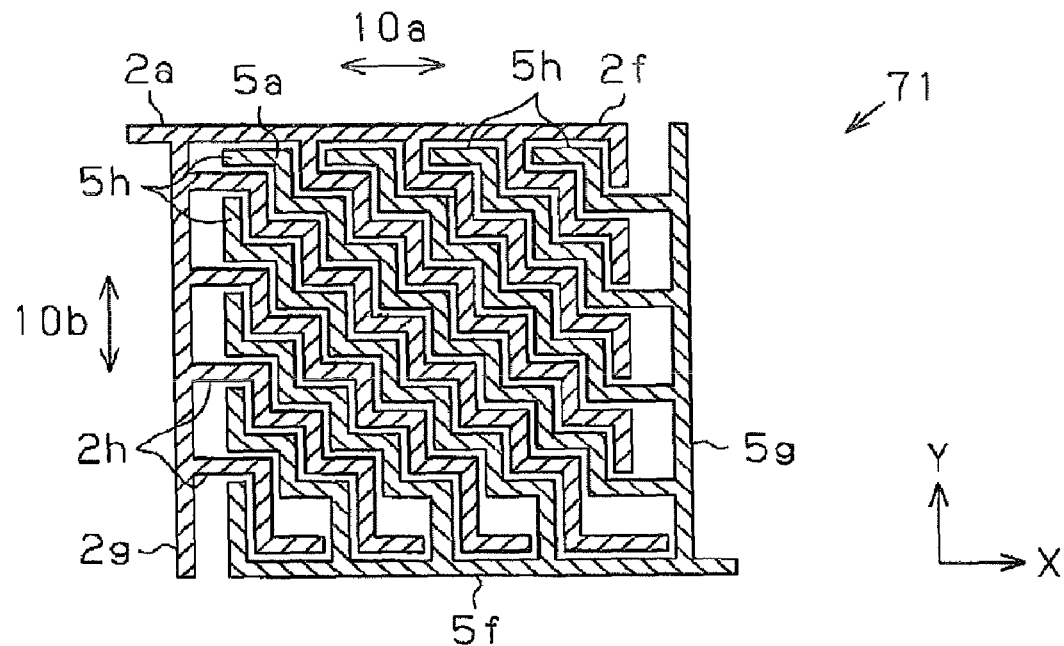
FIG. 4 is a plan view showing the shape of the electrodes in an electric power generator according to a second embodiment of the present invention.

An electric power generator 71 according to a second embodiment of the present invention will now be described with reference to FIG. 4. The electric power, generator 71 of the second embodiment differs from the first embodiment only in the shapes of an electret electrode 2*a* and a movable electrode 5*a*. The electrodes 2*a* and 5*a* respectively include a plurality of zigzagged strips 2*h* and 5*h* alternately bent and extended in the X-axis direction and the Y-axis direction. It is preferred that the zigzagged strips of each electrode do not intersect one another. The strips 2*h* of the electret electrode 2*a* are connected to a branched common wire 2*f* extending in the X-axis direction or a branched common wire 2*g* extending in the Y-axis direction. The strips 5*h* are connected to a branched common wire 5*f* extending in the X-axis direction and a branched common wire 5*g* extending in the Y-axis direction. It is preferred that the electret electrode 2*a* and the movable electrode 5*a* be shaped in a complementary manner.

It is preferred that the amount of change in the overlapping area of the movable electrode 5*a* and the electret electrode 2*a* when the movable electrode 5*a* moves a certain distance in only the X-axis direction (arrow 10*a*) be the same as the amount of change in the overlapping area when the movable electrode 5*a* moves the same certain distance in only the Y-axis direction (arrow 10*b*).

The electric power generator 71 of the second embodiment of the present invention has the advantages described below.

(3) The power generating amount is the same when displacement in the X-axis direction (arrow 10*a*) and the Y-axis direction (arrow 10*b*) occurs for the same distance. Thus, electric power is efficiently generated from external vibrations having amplitude in any direction within the XY plane compared to an electric power generator in which the amount of change in the overlapping area differs for vibrations in one direction and vibrations in another direction.

(4) The electret electrode 2*a* and the movable electrode 5*a* are each include segmented portions extending in both X and Y-axis directions. Thus, the overlapping area of the opposing electrodes (the electret electrode 2*a* and movable electrode 5*a*) changes greatly in response to smaller external vibrations. This enable the generation of electric power with smaller external vibrations and increases the efficiency for generating power from external vibrations in any direction within the XY plane.

The second embodiment of the present invention may be modified as described below. In the example shown in FIG. 5, an electret electrode 2*b* and a movable electrode 5*b* respectively include common wires 2*i* and 5*i* extending in an X-direction and a plurality of curved strips 2*j* and 5*j* extending in a substantially concentric manner. It is preferred that the curved strips of each electrode do not intersect one another. Further, it is preferred that the electret electrode 2*b* and the movable electrode 5*b* be shaped in a complementary manner. It is preferred that the amount of change in the overlapping area of the movable electrode 5*b* and the electret electrode 2*b* when the movable electrode 5*b* moves a certain distance in only the X-axis direction (arrow 10*a*) be the same as the amount of change in the overlapping area when the movable electrode 5*b* moves the same certain distance in only the Y-axis direction (arrow 10*b*) The remaining structure is the same as the second embodiment.

Figure 5:
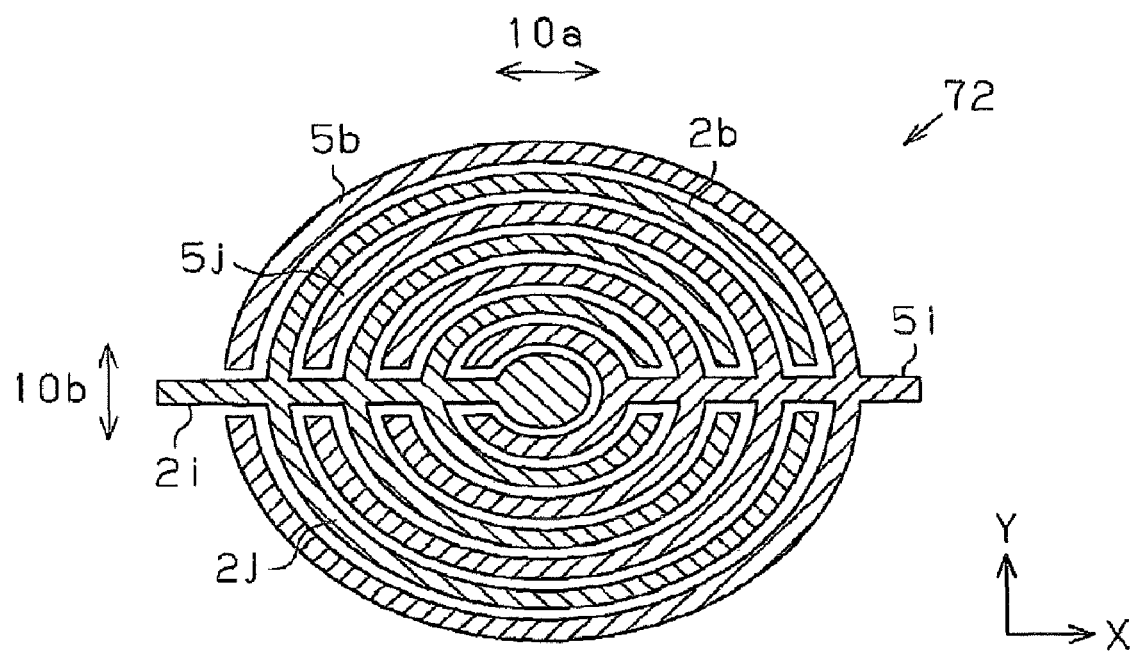
FIG. 5 is a plan view showing the shape of the electrodes in a modification of an electric power generator of the second embodiment.

The electric power generator 72 of the modification shown in FIG. 5 has the same advantages as the second embodiment.

Figure 6A:
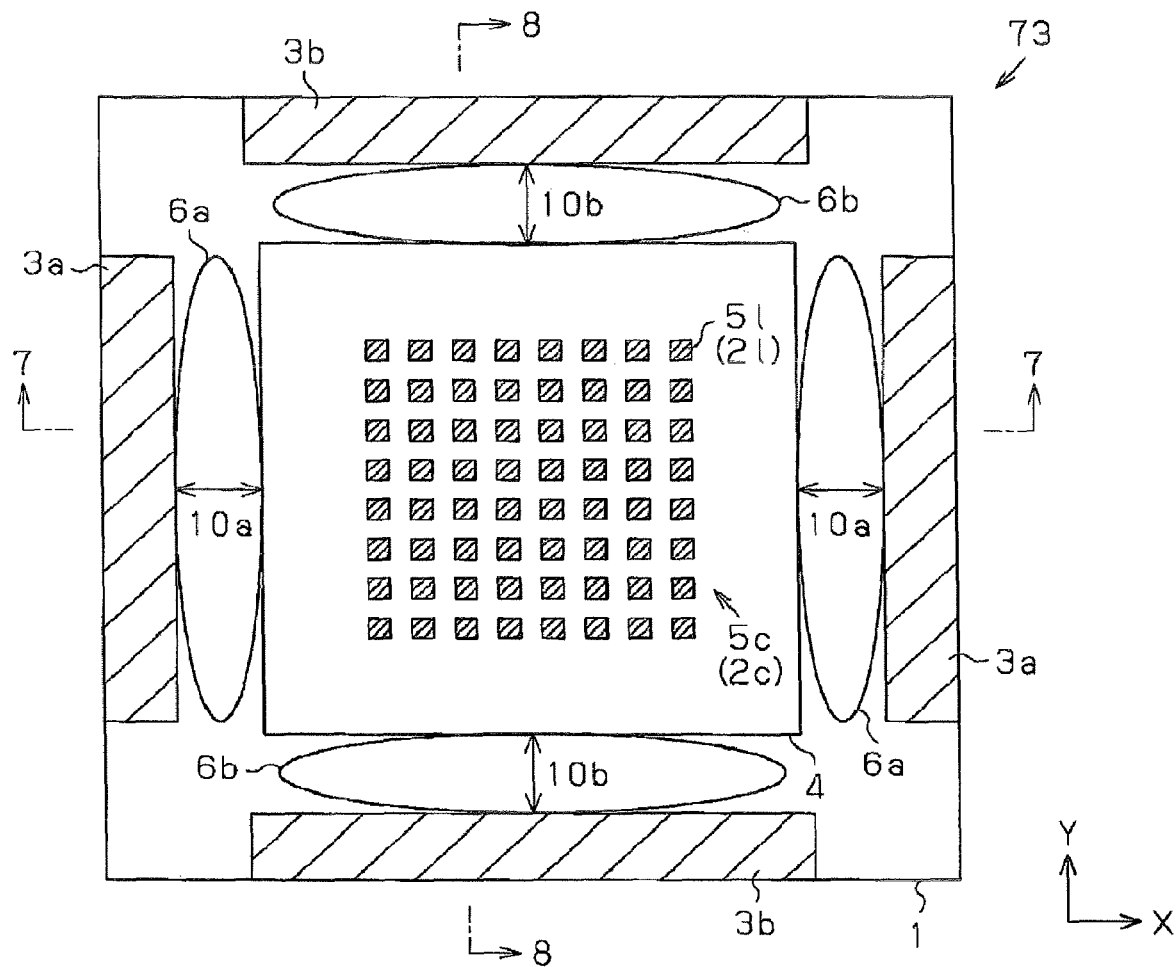
FIG. 6A is a schematic plan view showing an electric power generator according to a third embodiment of the present invention.
Figure 7:
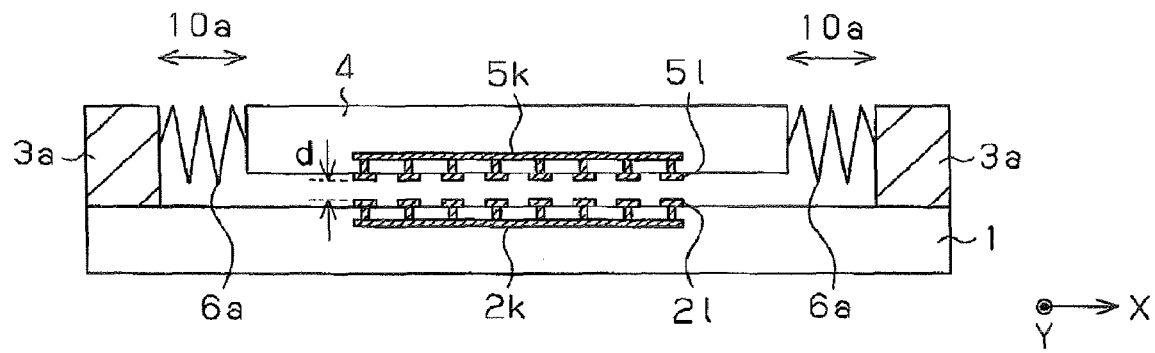
FIG. 7 is a schematic cross-sectional view of the electric power generator taken along line 7-7 in FIG. 6A.
Figure 8:
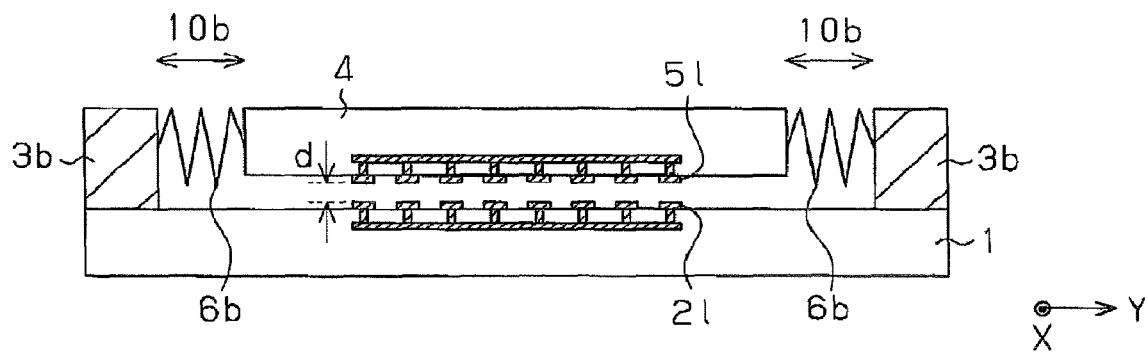
FIG. 8 is a schematic cross-sectional view of the electric power generator taken along line 8-8 in FIG. 6A.

An electric power generator 73 according to a third embodiment of the present invention will now be described with reference to FIGS. 6A, 7, and 8. The difference between the electric power generator 73 of the third embodiment and the first embodiment is in the shape and layout of an electret electrode 2*c* and a movable electrode 5*c*. The remaining structure is the same as the first embodiment.

Specifically, the electret electrode 2*c* and the movable electrode 5*c* respectively include a plurality of electrode pads 21 and 51 laid out in a two-dimensional array. For example, the electret electrode 2*c* arranged on the fixed substrate 1 is connected to the fine electrode pads 21, which are laid out in a cyclic repetitive pattern, and a common wire 2*k* through connection holes from the surface opposite the surface facing the movable electrode 5*c*. The movable electrode 5*c* arranged on the movable substrate 4 has the same structure.

The electret electrode 2*c* and the movable electrode 5*c* each includes a plurality of pads laid out in a two-dimensional array. Thus, it is relatively easy to equalize the amount of change in the overlapping area of the movable electrode 5*c* and the electret electrode 2*c* when the movable electrode 5*c* moves a certain distance in only the X-axis direction (arrow 10*a*) and the amount of change in the overlapping area when the movable electrode 5*c* moves the same certain distance in only the Y-axis direction (arrow 10*b*).

The electric power generator 73 of the third embodiment has the advantages described below.

(5) The electret electrode 2*c* and the movable electrode 5*c* each include fine electrode pads laid out in a cyclic repetitive pattern. Thus, the overlapping area between the opposing electrodes (the electret electrode 2*c* and the movable electrode 5*c*) changes greatly even with smaller external vibrations. This improves the vibration response and the efficiency for generating power.

(6) Since the power generating amount is the same when displaced by the same distance for the X-axis direction (arrow 10*a*) and the Y-axis direction (arrow 10*b*), the electric power is efficiently generated with respect to the external vibration in an arbitrary direction within the XY plane compared to when electric power is generated with the amount of change in the overlapping area biased towards one side. Thus, electric power is efficiently generated from external vibrations having amplitude in any direction within the XY plane compared to an electric power generator in which the amount of change in the overlapping area differs for vibrations in one direction and vibrations in another direction.

Examples in which the electret electrode 2 (2a to 2c) is arranged on the fixed substrate 1, and the movable electrode 5 (5a to 5c) is arranged on the movable substrate 4 have been described in the first to the third embodiments. However, the present invention is not limited in such a manner. For example, the electret electrode 2 (2a to 2c) may be arranged on the movable substrate 4 and the movable electrode 5 (5a to 5c) may be arranged on the fixed substrate 1. This would obtain the same advantages as the first to the third embodiments.

Figure 6B:
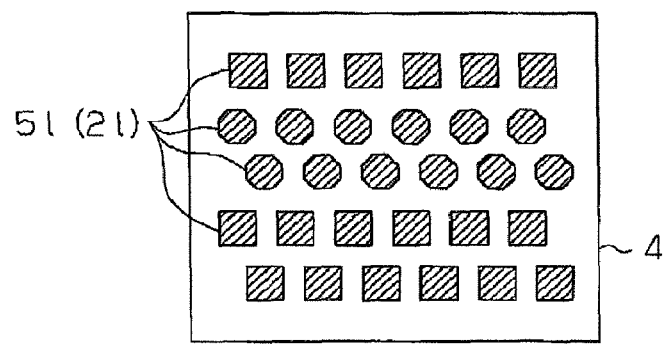
FIG. 6B is a schematic plan view showing a modification of the third embodiment.

The electrode pads 21 and 51 of the electret electrode 2c and the movable electrode 5c are square in the third embodiment. However, the present invention is not limited in such a manner. For example, as long as the amount of change in the overlapping area is the same for the X-axis direction and the Y-axis direction, the electrode pads 21 and 51 may be formed to have the shape of a circle, a regular polygon, or a combination of these shapes (refer to FIG. 6B). This obtains the same advantages as the third embodiment.

Figure 10A:
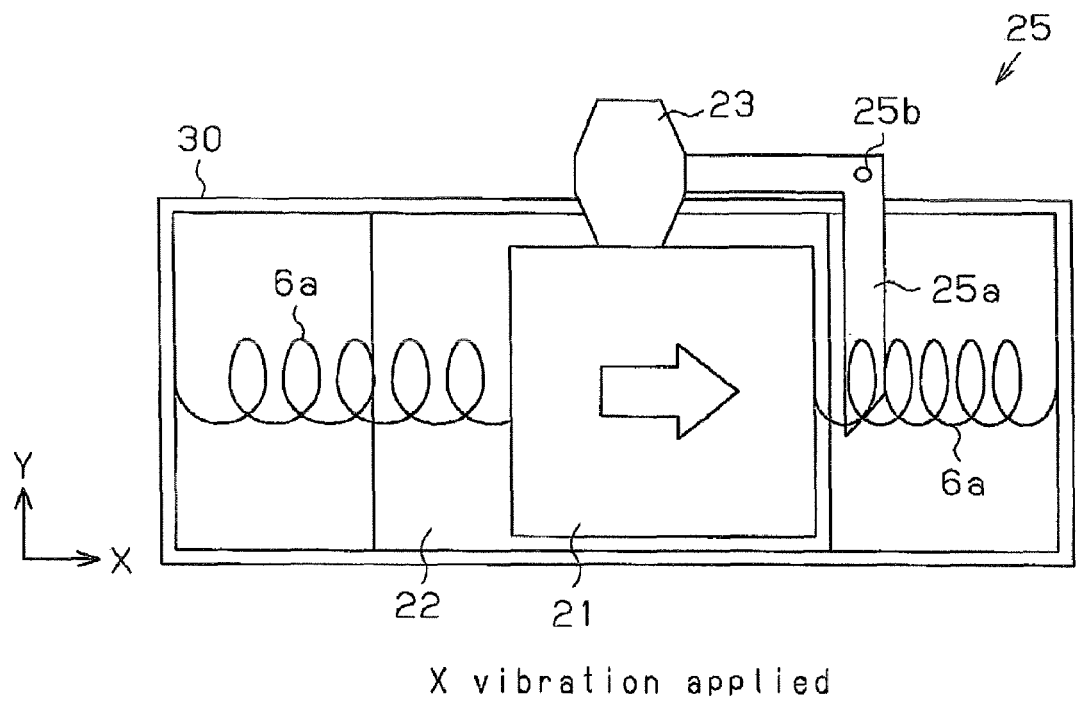
FIGS. 10A and 10B are front views showing an electric power generator according to a fourth embodiment of the present invention.
Figure 10B:
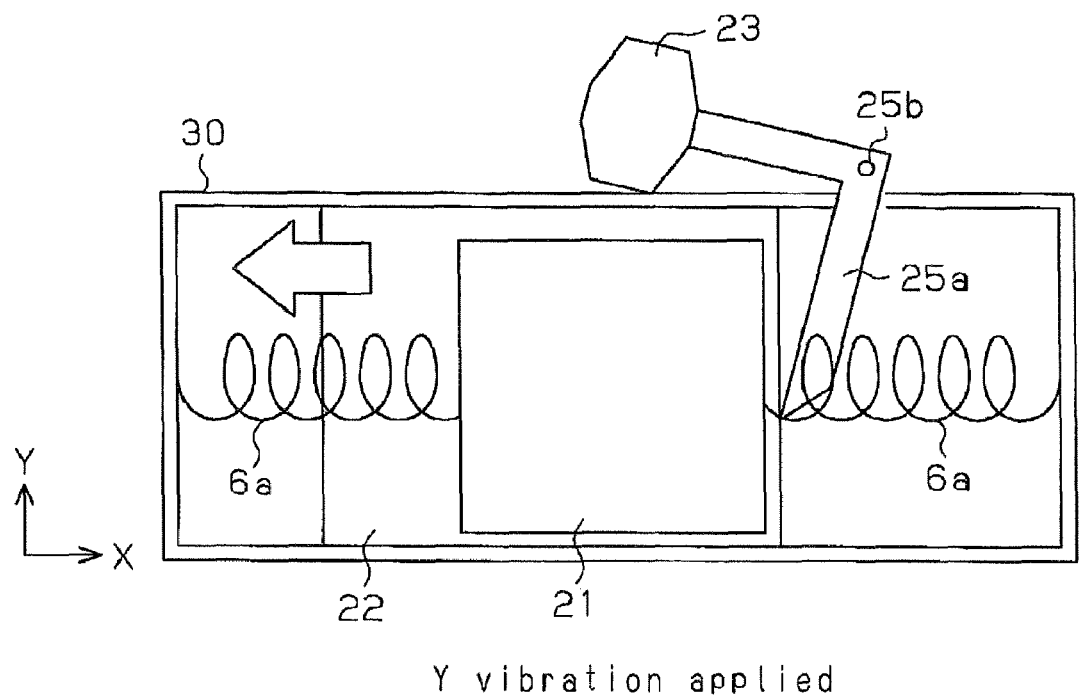

An electric power generator 74 according to a fourth embodiment of the present invention will now be described with reference to FIGS. 10A and 10B. The electric power generator 74 includes a first electrode 21, a second electrode 22, a movable weight 23, and a frame 30.

The first electrode 21 and the second electrode 22 are each supported by the frame 30 in a manner enabling reciprocation in the X-axis while substantially maintaining a predetermined distance d therebetween (see FIG. 1).

A bent lever 25a is tiltably or swingably supported about a pin 25b. The bent lever 25a has a first end attached to the movable weight 23 and a second end moved toward and away from the right side of the second electrode 22. The bent lever 25a converts the movement of the movable weight 23 along the Y-axis into movement along the X-axis and transmits such movement to the second electrode 22. The movable weight 23 functions as a vibration sensing weight, and the bent lever 25a functions as a transmission mechanism.

The first electrode 21 or the second electrode 22 includes an electrode covered by the electret film. The first electrodes 21 and the second electrodes 22 may be conformed in the same manner as the pairs of electrodes (2, 5; 2a, 5a; 2b, 5b; 2c, 5c) in the first to the third embodiments.

The operation of the electric power generator 74 will now be described.

The first electrode 21 moves along the X-axis when external vibrations in directions other than a direction perpendicular to the X-axis direction is applied to the electric power generator 74. Movement of the first electrode 21 changes the overlapping area of the first electrode 21 and the second electrode 22. This causes the electric power generator 74 to generate electric power.

The movable weight 23 moves along the Y-axis when the external vibrations in directions other than a direction perpendicular to the Y-axis direction is applied to the electric power generator 74. For example, when the movable weight 23 moves upward, the second end of the bent lever 25a moves to the left along the X-axis, pushes the second electrode 22 to the left, and moves the second electrode 22 to the left. Movement of the second electrode 22 along the X-axis direction changes the overlapping area between the first electrode 21 and the second electrode 22. This causes the electric power generator 74 to generate electric power.

In this manner, the electric power generator 74 thus uses external vibrations in a plurality of directions excluding directions perpendicular to the X and Y-axis directions to generate electric power.

The electrodes 21 and 22 are moved by the vibrations in the plurality of directions. Thus, the added kinetic momentum of the external vibration in the plurality of directions can be used to generate electric power.

The electric power generator 74 of the fourth embodiment may be modified as below.

A motion restriction mechanism may be used to reduce or prohibit equal speed parallel movement of the first electrode 21 and the second electrode 22. For example, a stopper strip that engages the movable weight 23 or the bent lever 25a may be used to stop the movement of the movable weight 23 or the bent lever 25a when the first electrode 21 moves in the X-axis direction from the neutral position. When the stopper strip engages the movable weight 23 or the bent lever 25a, the relative movement speed of the first electrode 21 and the second electrode 22 is prohibited from becoming zero even when the electric power generator 74 simultaneously receives external vibrations in various directions. This avoids a situation in which the overlapping area of the two electrodes does not change. Accordingly, the electric power generator 74 generates electric power efficiently.

Figure 11A:
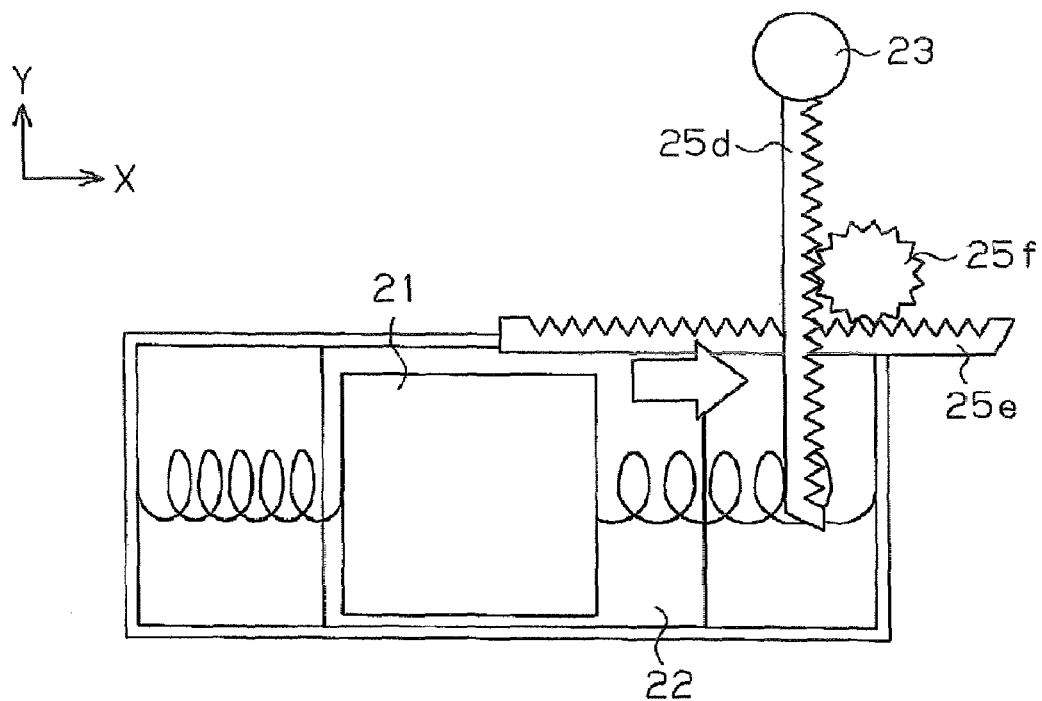
FIGS. 11A and 11B are front views showing a modification of the electric power generator in the fourth embodiment.

A rack and pinion mechanism may be used in place of the bent lever 25a as the transmission mechanism. In the example shown in FIG. 11A, the movable weight 23 is attached to one end of a rack 25d extending along the Y-axis. A rack 25e extending along the X-axis is coupled to the second electrode 22. The two racks 25d and 25e are each mated with a pinion gear 25f. The movement of the movable weight 23 in the Y-axis direction is converted to the movement of the second electrode 22 in the X-axis by the rack 25d, the pinion gear 25f, and the rack 25e. This causes the electric power generator of FIG. 11A to generate electric power from external vibrations in a plurality of directions in the same manner as the electric power generator of FIG. 10.

Figure 11B:
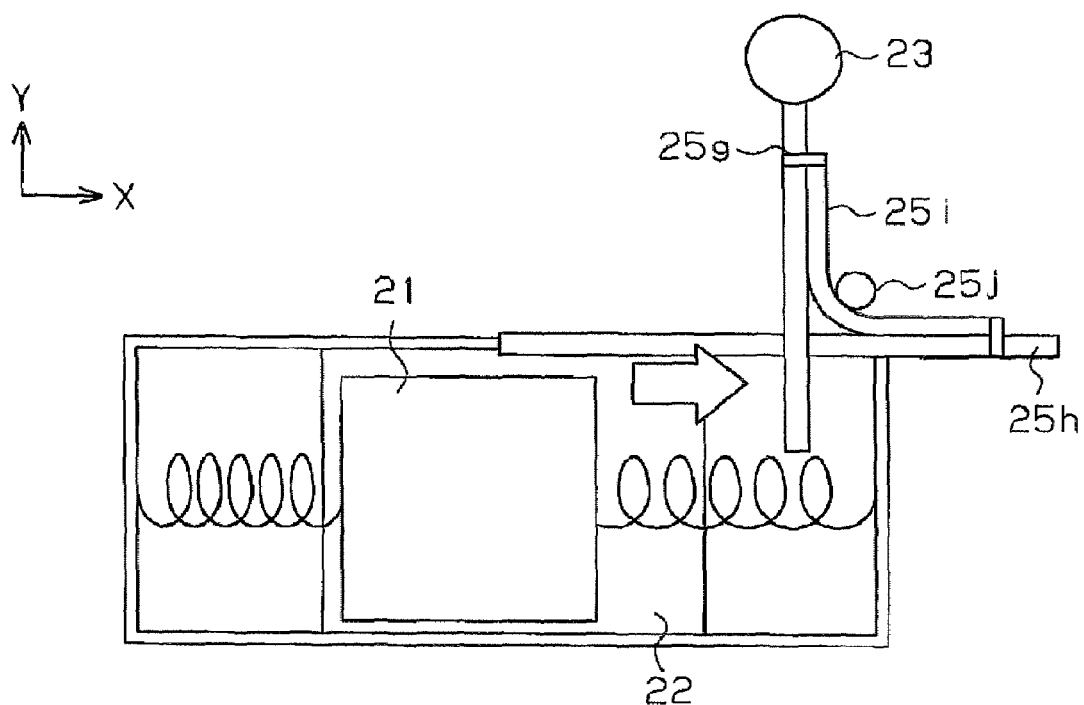

FIG. 11B shows another modification of FIG. 10. The movable weight 23 is attached to one end of a rod 25g extending along the Y-axis. A rod 25h extending along the X-axis is coupled to the second electrode 22. Two ends of a flexible tube 25i are connected to the two rods 25g and 25h. The flexible tube 25i is maintained in a gradually flexed state by a guide 25j. Movement of the movable weight 23 in the Y-axis direction is converted into movement of the second electrode 22 in the X-axis by the rod 25g, the flexible tube 25i, and the rod 25h. The electric power generator of FIG. 11B thus generates electric power using external vibrations in a plurality of directions in the same manner as the electric power generator of FIG. 10.

Figure 9:
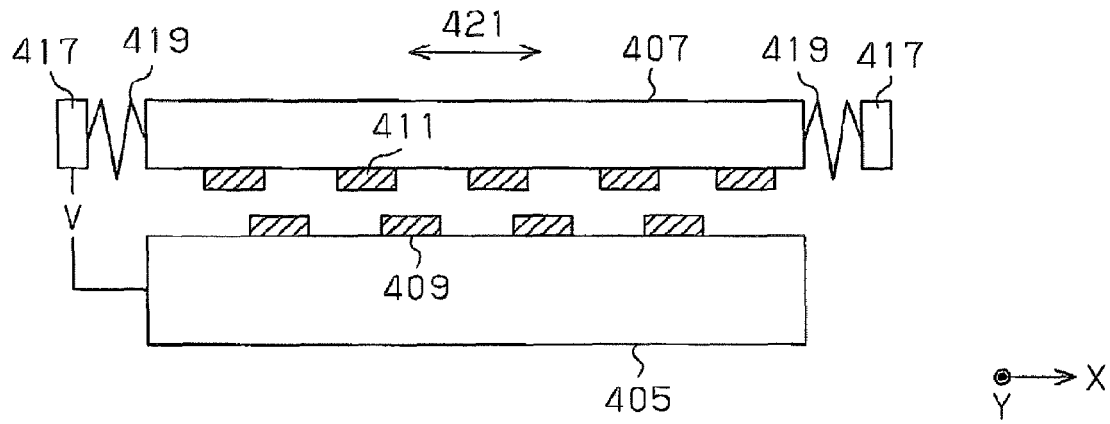
FIG. 9 is a schematic cross-sectional view of an electrostatic induction type electric power generator in the prior art.

In the case of the prior art electric power generator shown in FIG. 9, two electric power generators are required to generate electric power from external vibrations in two directions. In comparison, the electric power generator of the fourth embodiment enables the generation of electric power from external vibrations in two directions with just one electric power generator. The reduction in the number electric power generators simplifies and miniaturizes a power generation unit.

Figure 12:
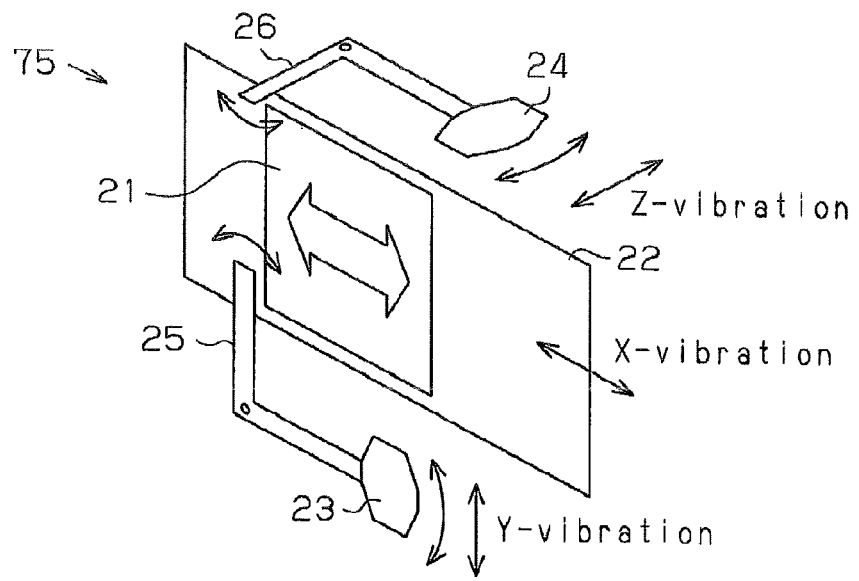
FIG. 12 is a perspective view showing an electric power generator according to a fifth embodiment of the present invention.

An electric power generator 75 according to a fifth embodiment of the present invention will now be described with reference to FIG. 12 As shown in FIG. 12, the electric power generator 75 of the fifth embodiment includes the first electrode 21 and the second electrode 22, which are opposed to each other. When the electric power generator 75 receives external vibrations, either one or both of the electrodes 21 and 22 are moved regardless of the direction of the external vibrations. This changes the overlapping area (opposed area) of the electrodes 21 and 22. A first transmission mechanism 25 supports a Y-axis movable weight 23 in a manner enabling reciprocation only along the Y-axis. A second transmission mechanism 26 supports a Z-axis movable weight 24 in a manner enabling reciprocation only along the Z-axis. The first transmission mechanism 25 converts movement of the Y-axis movable weight 23 along the Y-axis into movement along the X-axis and then transmits the movement to the first electrode 21 or the second electrode 22. The second transmission mechanism 26 converts movement of the Z-axis movable weight 24 along the Z-axis into movement along the X-axis and then transmits the movement to the first electrode 21 or the second electrode 22.

The operation of the electric power generator 75 of FIG. 12 will now be described.

At least one of the first electrodes 21 and the second electrodes 22 moves along the X-axis when external vibrations in a direction other than a direction perpendicular to the X-axis direction is applied to the electric power generator 75.

The Y-axis movable weight 23 moves along the Y-axis when external vibrations in a direction other than a direction perpendicular to the Y-axis direction is applied to the electric power generator 75. The first transmission mechanism 25 converts movement of the Y-axis movable weight 23 along the Y-axis into movement along the X-axis and then transmits the movement to the first electrode 21 or the second electrode 22. Therefore, either the first electrode 21 or the second electrode 22 moves in the X-axis direction.

The Z-axis movable weight 24 moves along the Z-axis when external vibrations in a direction other than a direction perpendicular to the Z-axis direction is applied to the electric power generator 75. The second transmission mechanism 26 converts movement of the Z-axis movable weight 24 along the Z-axis into movement along the X-axis and then transmits the movement to the first electrode 21 or the second electrode 22. Therefore, either the first electrode 21 or the second electrode 22 moves in the X-axis direction.

In this manner, at least either one of the first electrode 21 and the second electrode 22 moves along the X-axis irrespective of the direction of the external vibrations received by the electric power generator 75 and changes the overlapping area between the first electrode 21 and the second electrode 22. The electric power generator 75 thus generates electric power from external vibrations in all directions.

The Z-axis is an example of the "third axis" in the present invention.

The electric power generator 75 of the fifth embodiment will be described in further detail with reference to FIGS. 13, 14A, 14B, and 15.

The electric power generator 75 has a frame 30, which includes fixtures 3a, an upper guide rail 30a, and a lower guide rail 30b. A first substrate 21a, on which the first electrode 21 is formed, and a second substrate 22a, on which the second electrode 22 is formed, are supported by the upper guide rail 30a and the lower guide rail 30b in a manner enabling reciprocation only along the X-axis. A predetermined distance d (see FIG. 1) between the electrodes 21 and 22 is substantially maintained during movement of each of the first and second electrodes 21 and 22.

The first electrodes 21 or the second electrodes 22 may include an electrode covered by the electret film. The first electrodes 21 and the second electrodes 22 may be formed in the same manner as the pairs of electrodes (2, 5; 2a, 5a; 2b, 5b; 2c, 5c) in the first to the third embodiments.

The first substrate 21a is elastically connected to the fixture 3a by two spring driving bodies 6a. The elasticity of the spring driving bodies 6a enables the first substrate 21a to move along the X-axis and return to a neutral position after such movement.

The bent lever 25a is tiltably or swingably supported on the frame by a pin 25b extending along the Z-axis. The Y-axis movable weight 23 is attached to the first end of the bent lever 25a. The second end of the bent lever 25a is connected to the second substrate 22a by a link 25c. The bent lever 25a is elastically connected to the lower guide rail 30b by a spring driving body 6c. The elasticity of the spring driving body 6c enables the bent lever 25a to move along the Y-axis and return to a neutral position after such movement.

The second end of a bent lever 26a moves along the X-axis when the first end of the bent lever 25a moves along the Y-axis. The link 25c transmits the movement of the second end of the bent lever 25a along the X-axis to the second substrate 22a. Thus, the second substrate 22a moves along the X-axis when the Y-axis movable weight 23 moves along the Y-axis. The Y-axis movable weight 23 functions as a first vibration sensing weight, and the bent lever 25a and the link 25c function as a first transmission mechanism.

The bent lever 26a is supported in a manner that it is tiltable or swingably relative to the frame 30 by a pin 26b, which extends along the Y-axis. The Z-axis movable weight 24 is attached to the first end of the bent lever 26a. The second end of the bent lever 26a moves toward or away from a latch 22b formed on the second substrate 22a. The second end of the bent lever 26a moves along the X-axis when the first end of the bent lever 26a moves along the Z-axis. Therefore, when the Z-axis movable weight 24 moves along the Z-axis, the first end of the bent lever 26a engages with the latch 22b and pushes the latch 22b along the X-axis. This moves the second substrate 22a along the X-axis. The Z-axis movable weight 24 functions as a second vibration sensing weight, and the bent lever 26a functions as a second transmission mechanism. The fixtures 3a, the spring driving bodies 6a, the frame 30, the bent levers 25a and 26a, and the link 25c function as a support structure.

Figure 13:
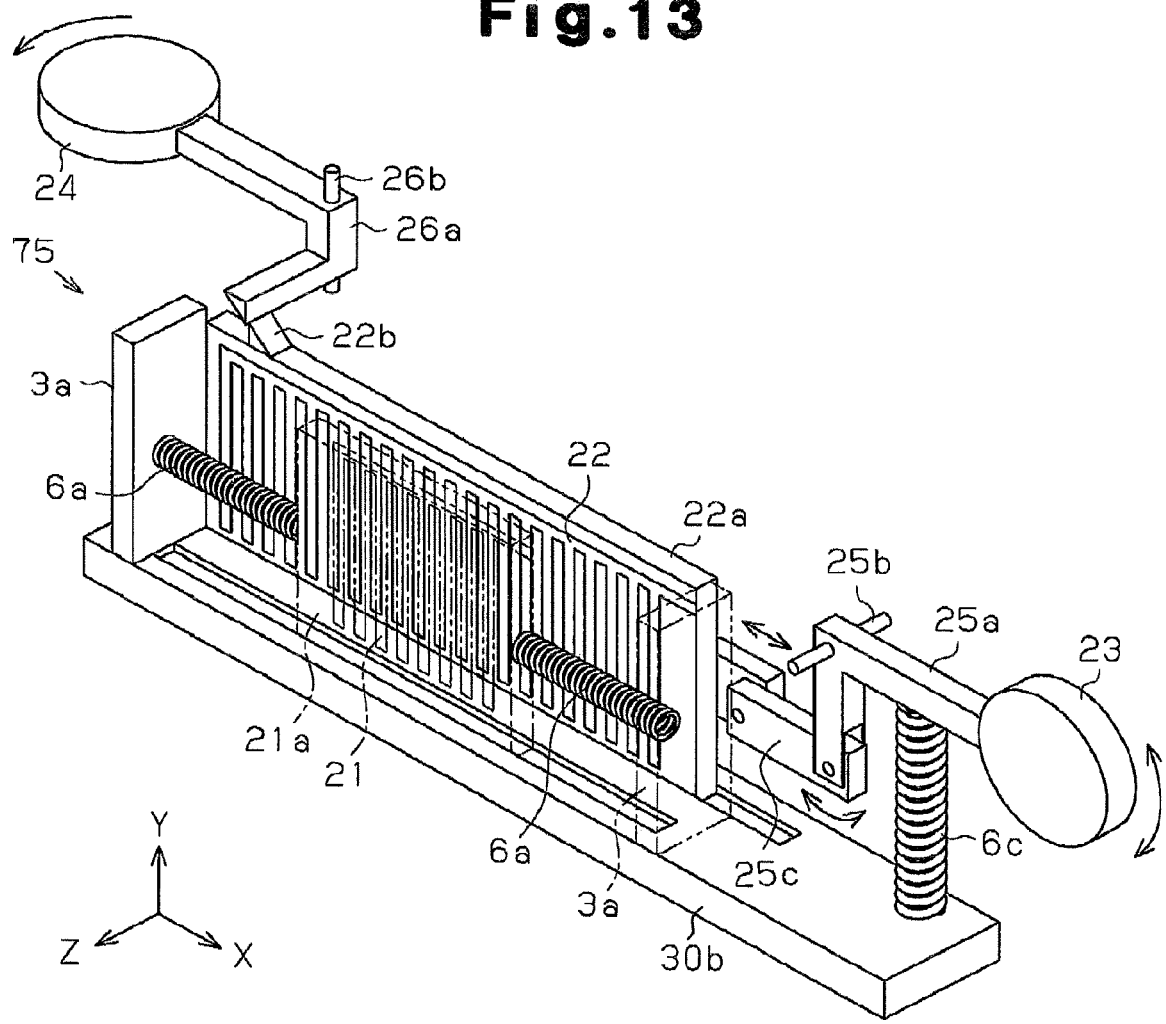
FIG. 13 is a detailed perspective view showing the electric power generator of FIG. 12.
Figure 14A:
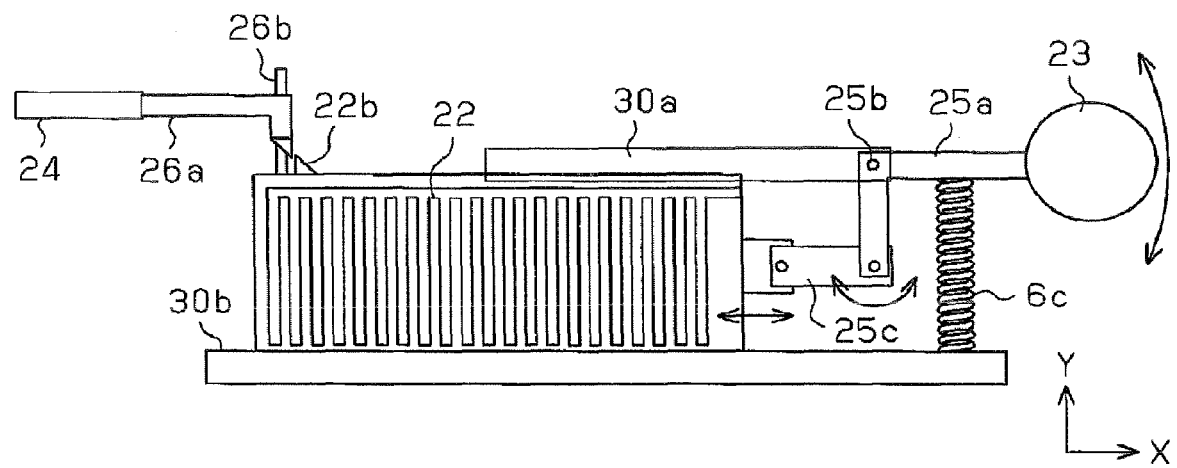
FIG. 14A is a front view showing the movement of a second electrode in the electric power generator of FIG. 13.
Figure 14B:
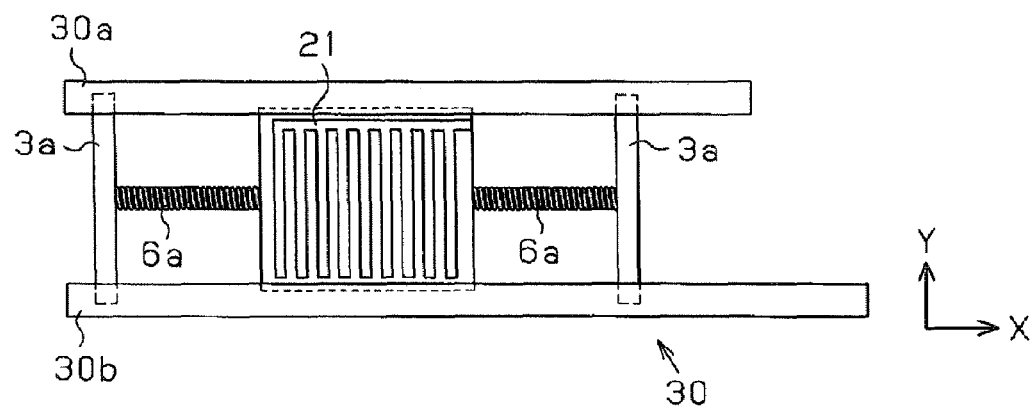
FIG. 14B is a front view showing the movement of a first electrode in the electric power generator of FIG. 13.
Figure 15:
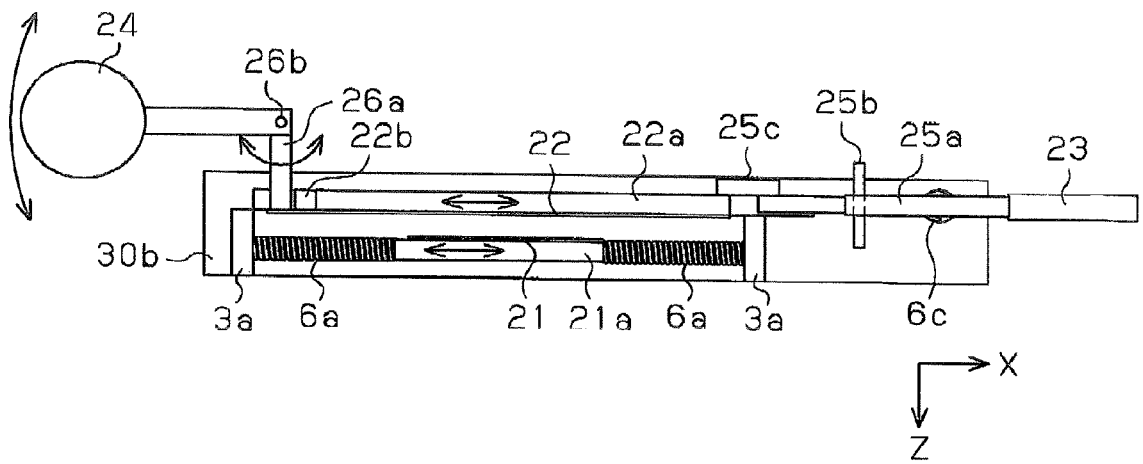
FIG. 15 is a top view showing relative movement of the first electrode and the second electrode in the electric power generator of FIG. 13.

The operation of the electric power generator 75 of FIG. 13 will now be described.

The first substrate 21a and the first electrode 21 move along the X-axis when the electric power generator 75 receives external vibrations in directions other than a direction perpendicular to the X-axis direction. Such movement changes the overlapping area of the first electrode 21 and the second electrode 22. Accordingly, the electric power generator 75 uses external vibrations in directions other than a direction perpendicular to the X-axis direction to generate electric power.

The Y-axis movable weight 23 moves along the Y-axis when the electric power generator 75 receives external vibrations in directions other than a direction perpendicular to the Y-axis direction. The bent lever 25a converts movement of the Y-axis movable weight 23 along the Y-axis into movement along the X-axis and then transmits the movement to the second substrate 22a. The movement of the second substrate 22a changes the overlapping area of the first electrode 21 and the second electrode 22. Accordingly, the electric power generator 75 uses external vibrations in directions other than a direction perpendicular to the Y-axis direction to generate electric power.

The Z-axis movable weight 24 moves along the Z-axis when the electric power generator 75 receives external vibrations in directions other than a direction perpendicular to the Z-axis direction. The bent lever 26a converts movement of the Z-axis movable weight 24 along the Z-axis into movement along the X-axis and then transmits the movement to the second substrate 22a. The movement of the second substrate 22a changes the overlapping area of the first electrode 21 and the second electrode 22. Accordingly, the electric power generator 75 uses external vibrations in directions other than a direction perpendicular to the Z-axis direction to generate electric power.

Two or three of the first substrate 21a, the Y-axis movable weight 23, and the Z-axis movable weight 24 move when the electric power generator 75 receives external vibrations in a diagonal direction. As described above, the movement of two or three of the first substrate 21a, the Y-axis movable weight 23, and the Z-axis movable weight 24 changes the overlapping area of the first electrode 21 and the second electrode 22. Accordingly, the electric power generator 75 uses external vibrations in a diagonal direction to generate electric power.

The electric power generator 75 generates electric power using external vibrations in all directions by combining the first substrate 21a and the first electrode 21, which function as the X-axis movable weight, with the Z-axis movable weight 24 and the Y-axis movable weight 23.

The electrodes 21 and 22 are moved by vibrations in a plurality of directions. Thus, the added kinetic momentum of the external vibrations in a plurality of directions can be used to generate electric power.

In the case of the prior art electric power generator shown in FIG. 9, three electric power generators are required to generate electric power from external vibrations in three directions. However, the electric power generator of the fifth embodiment enables the generation of electric power from external vibrations in various directions with just one electric power generator. The reduction in the number electric power generators simplifies and miniaturizes a power generation unit.

The electric power generator 75 of the fifth embodiment may be modified as below.

Figure 16:
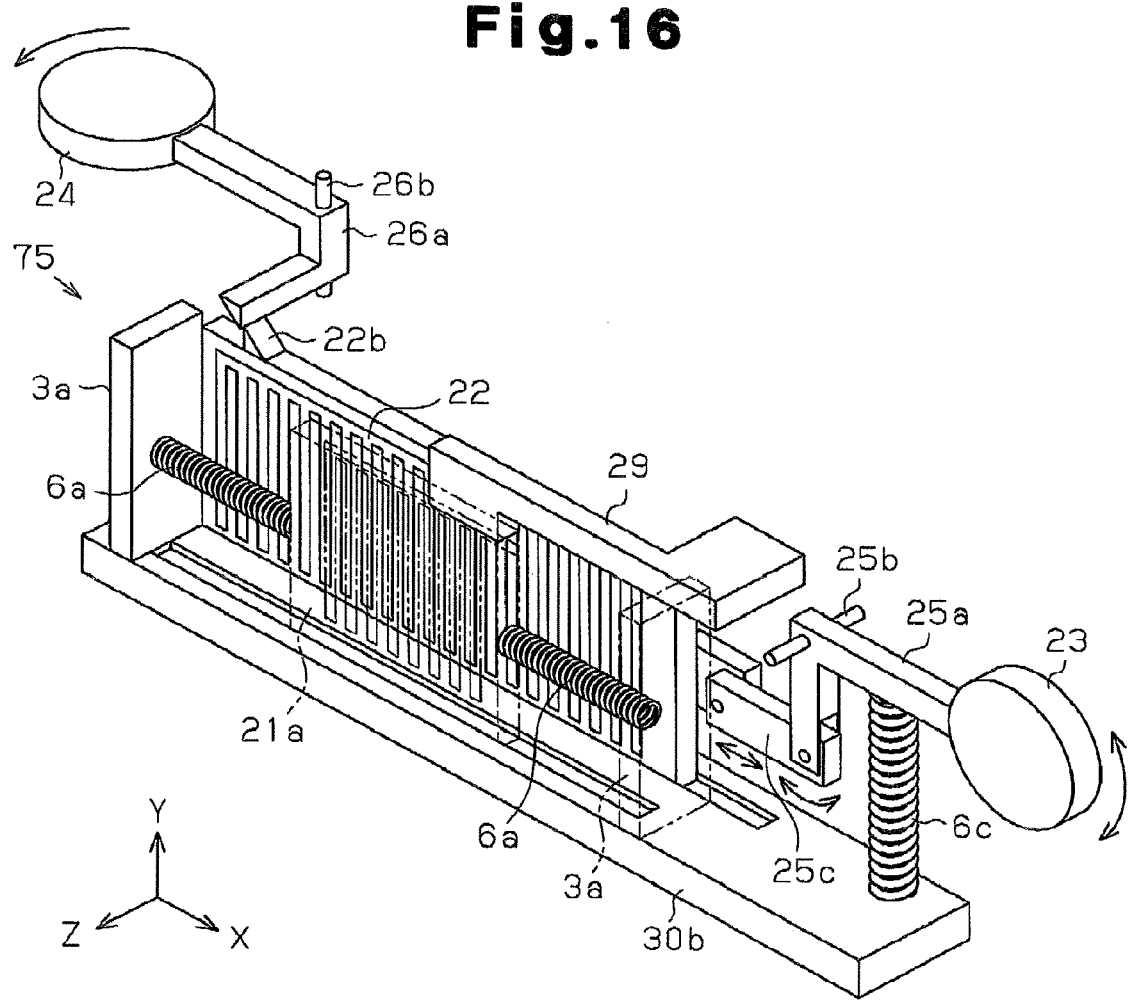
FIG. 16 is a perspective view showing a modification of the electric power generator of FIG. 13.
Figure 17:
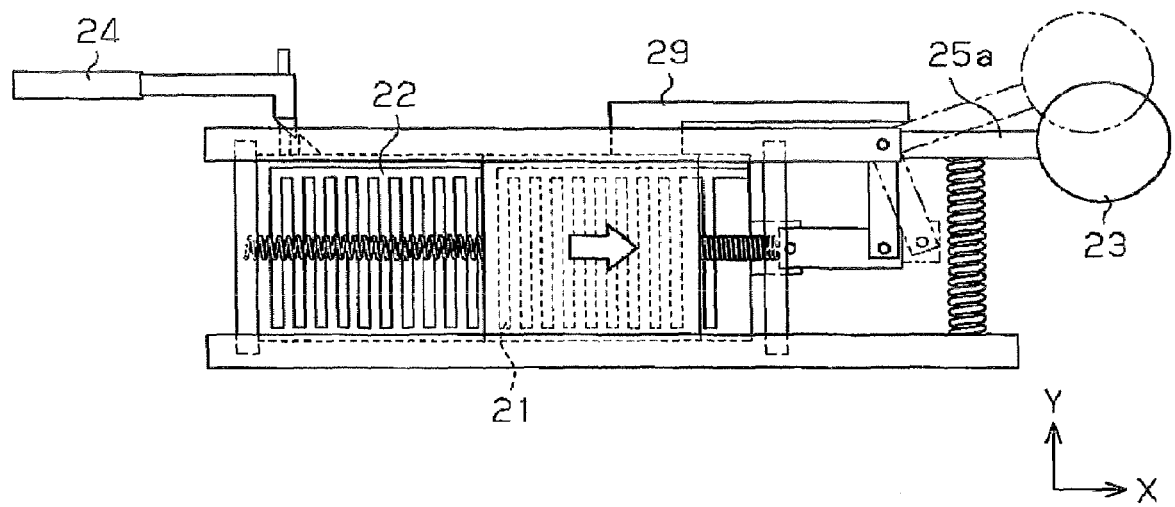
FIG. 17 is a front view showing the operation of the electric power generator of FIG. 16.

A motion restriction mechanism may be used to reduce or prohibit movement of the first electrode 21 and the second electrode 22 in the same direction. For example, as shown in FIG. 16, a stopper 29 functioning as a motion restriction mechanism may be attached to the first substrate 21a so as to be integrally movable with the first substrate 21a. As shown in FIG. 17, the stopper 29 moves close to or contacts part of the bent lever 25a when the first electrode 21 (first substrate 21a) moves to the right. If the Y-axis movable weight 23 starts to move upward in this state, the upward movement of the Y-axis movable weight 23 would be restricted since the stopper 29 is contacting part of the bent lever 25a. The second electrode 22 is prohibited from moving to the right when the first electrode 21 moves to the right. The stopper 29 prohibits the speed of the relative movement between the first electrode 21 and the second electrode 22 from becoming zero even if the electric power generator 75 simultaneously receives external vibrations in various directions. This avoids a situation in which the overlapping area of the first electrode 21 and the second electrode 22 does not change. Thus, the electric power generator 75 generates electric power efficiently.

The first and the second transmission mechanisms 25 and 26 may both be connected to the first electrode 21, and the second electrode 2 may be immovable. In such a case, the first electrode 21 moves along the X-axis when receiving external vibrations. Accordingly, the electric power generator generates electric power when receiving external vibrations.

The first transmission mechanism 25 and the second transmission mechanism 26 may be connected to the first electrode 21 and the second electrode 22, respectively. In such a case, the first electrode 21 moves along the X-axis when receiving external vibrations in directions other than a direction perpendicular to both X and Z-axis direction. Further, the second electrode 22 moves along the X-axis when receiving external vibrations in directions other than a direction perpendicular to the Y-axis direction. Accordingly, the electric power generator receives external vibrations in every direction and generates electric power.

In the first to fifth embodiments, the Y-axis (second axis) may intersect the X-axis (first axis) at a predetermined angle. For example, the Y-axis (second axis) may be perpendicular to the X-axis (first axis) or may be inclined relative to the X-axis at an angle other than 90 degrees. In the fifth embodiment, the Z-axis (third axis) may intersect each of the X-axis (first axis) and the Y-axis (second axis) at a predetermined angle. For example, the Z-axis (third axis) may be perpendicular to each of the X-axis (first axis) and the Y-axis (second axis) or may be inclined relative to each of the X-axis and the Y-axis at an angle other than 90 degrees.

In the first to fifth embodiments, the distance d between the two opposing electrodes when the electrodes are not moving may be the same as that or differ from that when the electrodes are moving.

In the first to third embodiments, one of the spring driving bodies 6a and spring driving bodies 6b may be eliminated and the movable substrate 4 may be supported by the other one of the spring driving bodies 6a and spring driving bodies 6b.

Examples of the use of the electric power generator of the present invention will now be described. The electric power generator of the present invention may be incorporated in an electric device to generate electric power for activating partially or entirely activating the electric device. In one example, the electric power generator of the present invention can be incorporated in an electric device that receives external vibrations. This enables the electric device to be powered in a self-sufficient manner. The following first to sixth examples illustrate use of the present invention in wireless devices, such as vehicle-related wireless devices.

FIRST EXAMPLE

Figure 18:
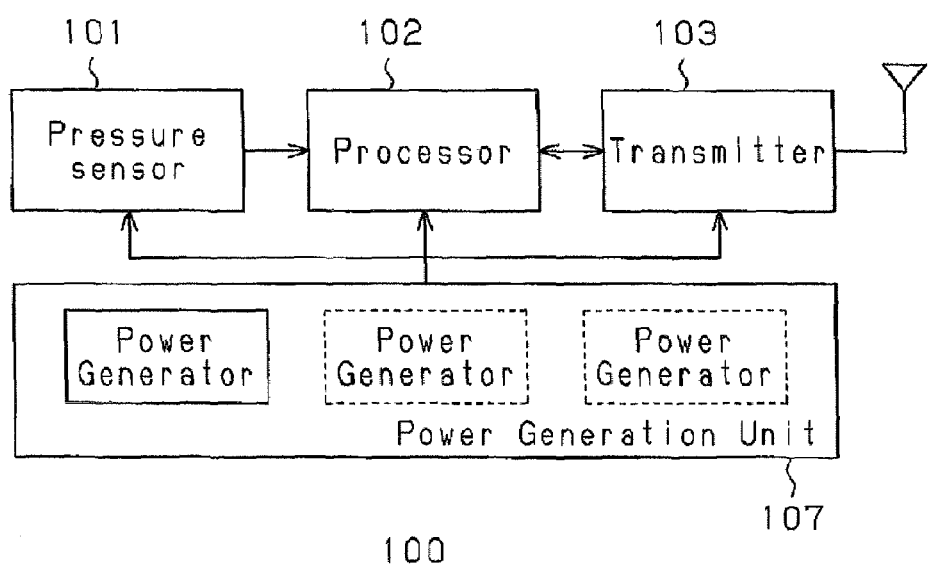
FIG. 18 is a block diagram of an electric device in a first example.

An example of a transmission device incorporating the electric power generator of the present invention will now be described with reference to FIG. 18. The electric power generator of the present invention is arranged in a transmission device that is attached to a location remote from a vehicle body, such as a tire or a tire wheel. The transmitter detects at least one of tire air pressure, in-tire temperature, in-tire acceleration, tire vibrations, tire rotation speed, ambient light amount, vehicle vibrations, and ambient temperature. Then, the transmitter performs wireless transmission of the detection result. FIG. 18 is a block diagram of a tire air pressure sensor device 100.

The tire air pressure sensor device 100 includes a pressure sensor portion 101 for detecting the tire air pressure and generating a sensor signal, a processor portion 102 for processing the sensor signal from the pressure sensor portion 101 and generating an information signal of the tire air pressure, a transmitter portion 103 for transmitting the information signal of the tire air pressure from the processor portion 102 to a receiver arranged in a vehicle body, and a power generation unit 107 for generating power to activate at least one of the pressure sensor portion 101, the processor portion 102, and the transmitter portion 103. One or a plurality of electric power generators 70 to 75 described in the above embodiments is arranged in the power generation unit 107.

The pressure sensor portion 101 detects the tire air pressure and outputs signals that differ when the detected air pressure is normal and when the detected air pressure is abnormal (low air pressure). The processor portion 102 performs a process for converting the output of the pressure sensor portion 101 into a modulated signal. The transmitter portion 103 transmits the modulated signal to the receiver (see FIG. 24) arranged in the vehicle body from an antenna through electromagnetic waves. The power generation unit 107 absorbs the external vibrations and converts the external vibrations to electric energy to generate power. Then, the power generation unit 107 supplies the generated power to the pressure sensor portion 101, the processor portion 102, and the transmitter portion 103.

A voltage stabilizing element such as capacitor and a voltage conversion circuit such as a DC-DC converter and a regulator may be arranged in the power generation unit 107. One voltage stabilizing element and/or one voltage conversion circuit may be arranged in the power generation unit 107. One voltage stabilizing element and/or one voltage conversion circuit may be arranged for each electric power generator.

The operation of the tire air pressure sensor device 100 will now be described.

When the vehicle starts to travel, vibrations are produced. The power generation unit 107 generates power by converting vibration energy, which is applied to the tire while the vehicle is traveling, into electric energy. The power generated by the power generation unit 107 is supplied to the pressure sensor portion 101, the processor portion 102, and the transmitter portion 103. In response to the voltage supply, the pressure sensor portion 101 transmits a signal, which corresponds to the state of the tire air pressure, to the processor portion 102. For example, the pressure sensor portion 101 detects whether the tire air pressure is within or outside a predetermined range. Then, the pressure sensor portion 101 transmits to the processor portion 102 a signal indicating a normal state if the pressure is within the range and a signal indicating an abnormal state if the pressure is outside the range. The processor portion 102 processes the signal transmitted from the pressure sensor portion 101, converts the signal to a modulated signal for electromagnetic wave transmission, and transmits the modulated signal to the transmitter portion 103 in constant cycles. The transmitter portion 103 receives the modulated signal from the processor portion 102 and transmits electromagnetic waves from an antenna. The transmitted electromagnetic waves are received by the receiver (not shown) arranged in the vehicle body. The receiver demodulates and converts the modulated signal to a signal indicating the state of the tire air pressure. The signal is received by, for example, an electronic control unit (ECU) for entirely or partially controlling the vehicle. The ECU then processes the signal and executes a control for the output of an alarm.

In the first example, the pressure sensor portion 101 is an example of a "sensor unit" of the present invention, the processor portion 102 is an example of a "processor" of the present invention, the transmitter portion 103 is an example of a "transmitter" of the present invention, and the power generation unit 107 is an example of a "power generation unit" of the present invention.

The first example has the advantages described below.

(1) The electric power generator 70 to 75 for absorbing external vibrations in various directions and generating electric energy is arranged in the power generation unit 107. Thus, the communication device may be stable operated over a long period of time using the vibrations of the tire.

(2) The power generation unit 107 includes the electric power generator 70 to 75 for absorbing external vibrations in various directions and generating electric energy. Thus, power is efficiently generated by absorbing every external vibration in every direction This enables stable operation of the communication device. Further, the power generation efficiency is prevented from being decreased by the generation of vibrations in random directions. This prevents erroneous operations of the communication device that would occur when the power generation efficiency decreases.

(3) The entire communication device is simplified and the production cost is reduced since the power generation unit 107 includes a single capacitor and voltage conversion circuit.

(4) Regular maintenance such as replacement of the battery, which is inevitable in the battery driven type tire air pressure sensor described in Japanese Laid-Open Patent Publication No. 2002-264618 is thus unnecessary. Furthermore, since the remaining amount of power does not need to be taken into consideration, the interval for the transmission of the detection result of the pressure sensor unit to the ECU may be shortened. Thus, the transmission frequency of the sensing data may be increased, and the ECU can recognize the state of the pressure sensor unit in real time.

(5) When using external vibrations in three directions to generate power with the prior art single-direction type electric power generator shown in FIG. 9), three single-direction type electric power generators must be arranged in the power generation unit 107. If the triple-direction type electric power generator 75 of the fifth embodiment is arranged in the power generation unit 107, external vibrations in three directions may be used to generate power by just one electric power generator 75. Alternatively, if the double-direction type electric power generators 70 to 74 of the first to the fourth embodiments are arranged in the power generation unit 107, external vibrations in three directions may be used to generate power with just two electric power generators 70 to 74. This reduces the number of electric power generators in the power generation unit 107. Thus, the size of communication device may easily be reduced and the wiring may be easily be simplified.

SECOND EXAMPLE

Figure 19:
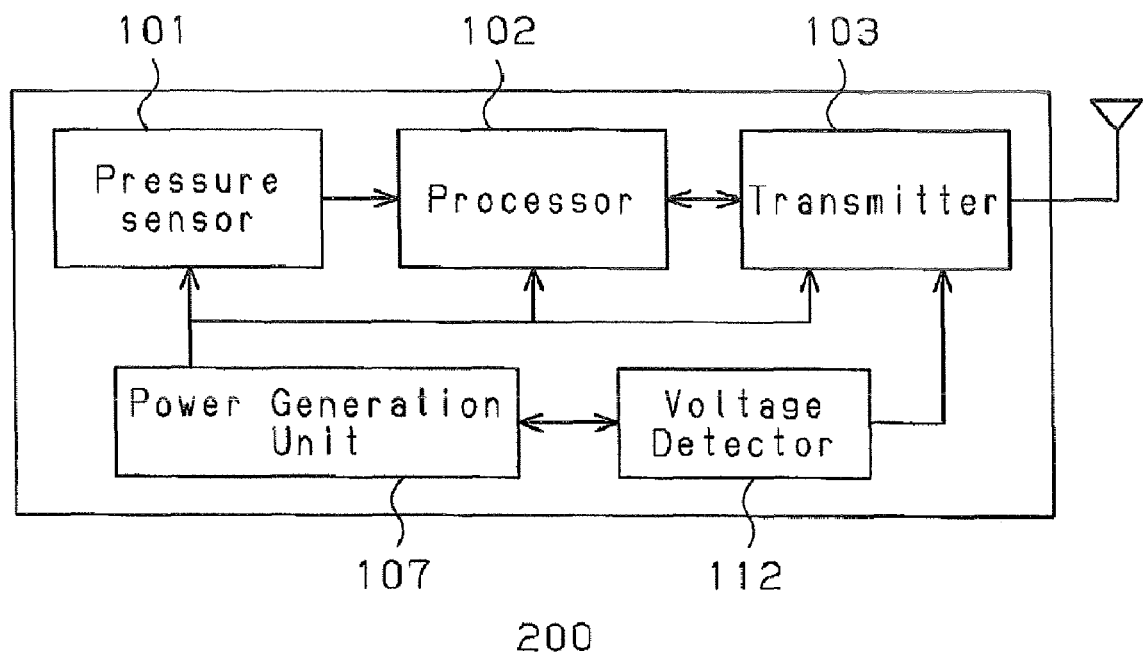
FIG. 19 is a block diagram of an electric device in a second example.

In the second to ninth examples described below, like or same reference numerals are given to those components that are the same as the corresponding components of the first example. Such components will not be described in detail. A tire air pressure sensor device 200 using the electric power generator of the present invention will now be described with reference to FIG. 19. The tire air pressure sensor device 200 is identical to the tire air pressure sensor device 100 of FIG. 18 except for a voltage detector portion 112.

The tire air pressure sensor device 200 includes a pressure sensor portion 101 for detecting the tire air pressure, a processor portion 102 for processing the sensor signal provided from the pressure sensor portion 101, a transmitter portion 103 for transmitting the information on the tire air pressure processed by the processor portion 102 to a receiver arranged in the vehicle body, a power generation unit 107 for generating power to activate at least one of the pressure sensor portion 101, the processor portion 102, and the transmitter portion 103, and a voltage detector portion 112 for detecting the voltage value of the power generation unit 107 and transmitting the detection to the transmitter. One or a plurality of the electric power generators 70 to 75 of the above embodiments for absorbing external vibrations in various directions and generating electric energy is arranged in the power generation unit 107.

The voltage detector portion 112 monitors the voltage value of the voltage generated by the power generation unit 107, determines whether the monitored voltage value is within or outside a predetermined range, and transmits the determination result to the transmitter portion 103. If the monitored voltage value is outside the predetermined range, the pressure sensor portion 101, the processor portion 102, and the transmitter portion 103 driven by the power generation unit 107 may operate abnormally. In such a case, even if the air pressure detection result of the pressure sensor portion 101 is normal, the air pressure may be determined as being abnormal. Thus, the voltage detector portion 112 sends a message that the voltage value of the power generation unit 107 is abnormal to the transmitter portion 103.

The second example has the advantage described below.

(5) In an environment in which external vibrations are insufficient, if the voltage value generated by the power generation unit 107 decreases to a value in which at least one of the pressure sensor portion 101, the processor portion 102, and the transmitter portion 103 in the tire air pressure sensor device 200 does not operate normally and may function erroneously, such a state is detected. The detected information is sent to the transmitter portion 103 and transmitted to the ECU arranged in the vehicle body to prevent the ECU from performing erroneous processes.

THIRD EXAMPLE

Figure 20:
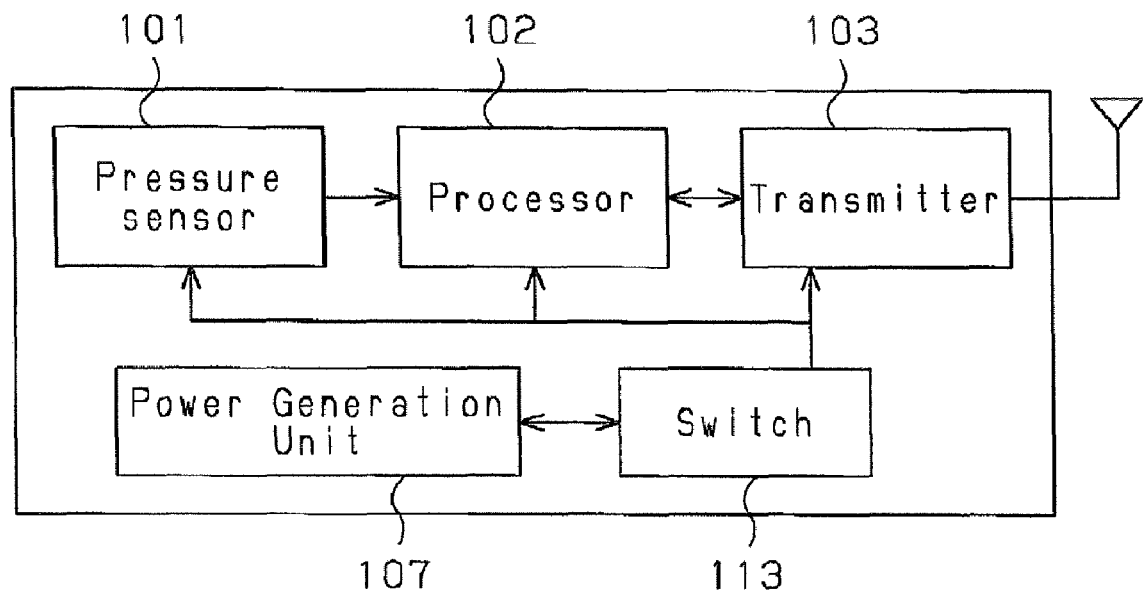
FIG. 20 is a block diagram of an electric device in a third example.

A tire air pressure sensor device 300 using the electric power generator of the present invention will now be described with reference to FIG. 20. The tire air pressure sensor device 300 of FIG. 20 includes a power supply switch portion 113 connected between the pressure sensor portion 101, the processor portion 102, and the transmitter portion 103, and the power generation unit 107.

The tire air pressure sensor device 300 includes the pressure sensor portion 101 for detecting the tire air pressure, the processor portion 102 for processing the sensor signal received from the pressure sensor portion 101, the transmitter portion 103 for transmitting the information on the tire air pressure processed by the processor portion 102 to the receiver arranged in a vehicle body, the power generation unit 107 for generating power to activate at least one of the pressure sensor portion 101, the processor portion 102, and the transmitter portion 103, and the power supply switch portion 113 for selectively supplying the generated voltage in the power generation unit 107 to the pressure sensor portion 101, the processor portion 102, and the transmitter portion 103. One or a plurality of electric power generators 70 to 75 for absorbing external vibrations in various directions and generating electric energy described in the above embodiments is arranged in the power generation unit 107.

The power supply switch portion 113 electrically connects the power generation unit 107 to the pressure sensor portion 101, the processor portion 102, and the transmitter portion 103 when power is generated by the power generation unit 107 as the automobile moves. The power supply switch portion 113 electrically disconnects the pressure sensor portion 101, the processor portion 102, and the transmitter portion 103 from the power generation unit 107 and becomes grounded by connecting to, for example, VSS, when the power generation unit 107 is not generating power. When the power generation is restarted, the power supply switch portion 113 is disconnected from the VSS ground reconnected to the power generation unit 107. If the automobile stops moving (for a certain time or longer measured by a timer), the power generation unit 107 is disconnected again from the pressure sensor portion 101, the processor portion 102, and the transmitter portion 103.

The third example of FIG. 20 has the advantages described below.

(6) Control is executed such that current flows only when the tire air pressure sensor device 300 must be activated. This improves the durability (lifetime) of the tire air pressure sensor device 300.

FOURTH EXAMPLE

Figure 21:
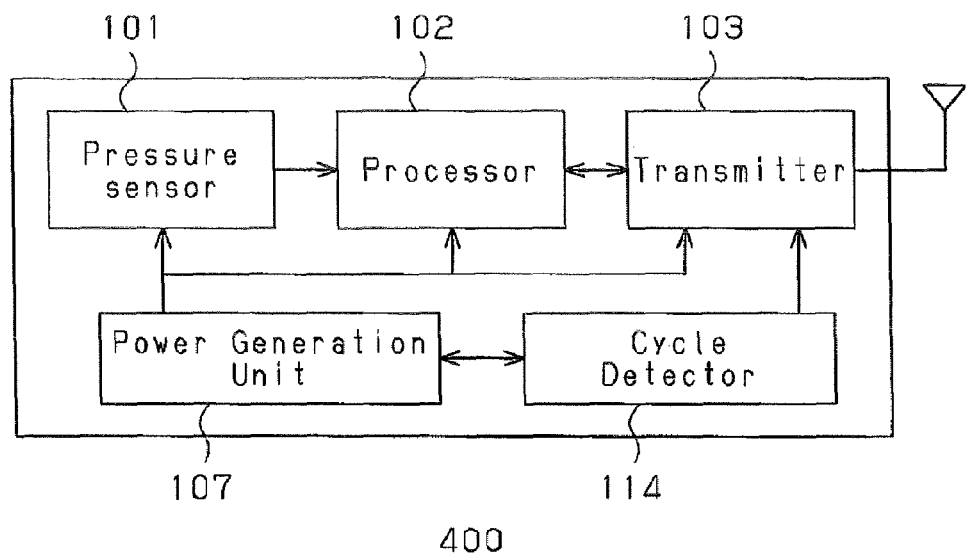
FIG. 21 is a block diagram of an electric device in a fourth example.

A tire air pressure sensor device 400 using the electric power device of the present invention will be described with reference to FIG. 21. As shown in FIG. 21, the tire air pressure sensor device 400 includes the pressure sensor portion 101 for detecting the tire air pressure, the processor portion 102 for processing the sensor signal received from the pressure sensor portion 101, the transmitter portion 103 for transmitting the information on the tire air pressure processed by the processor portion 102 to the receiver arranged in the vehicle body, the power generation unit 107 for supplying power to activate at least one of the pressure sensor portion 101, the processor portion 102, and the transmitter portion 103, and a cycle detector portion 114 for outputting cycle information on the power generation of the power generation unit 7 to the transmitter portion 103. One or a plurality of the electric power generators 70 to 75 of the above embodiments for absorbing external vibrations in various directions and generating electric energy is arranged in the power generation unit 107. The cycle detector portion 114 may provide the detected cycle information to the processor portion 102.

The cycle detector portion 114 retrieves the cycle information on power generation of the power generation unit 107 and provides the cycle information to the transmitter portion 103 or the processor portion 102. The power generation unit 107 is attached to a tire wheel of the vehicle. Vibrations are generated when the tire rotates and deforms as it touches the ground. The power generation unit 107 generates power using vibrations generated by the deformation of the tire portion located near the power generation unit 107. Electric power is generated whenever the tire rotates once. Thus, the power generation cycle indicates the rotation cycle of the tire. The cycle detector portion 114 detects and modulates the information of the power generation cycle and transmits the information to the transmitter portion 103. Then, the transmitter portion 103 transmits the information to the receiver arranged in the vehicle body through electromagnetic waves so that the ECU recognizes the rotation speed of the tire. The information on the power generation cycle detected by the cycle detector portion 114 may be transmitted to the processor portion 102, and the processor portion 102 may convert the information into a modulated signal and transmit the modulated signal to the transmitter portion 103.

The fourth example has the advantage described below.

(7) The information on the rotation cycle of the tire, which is the power generation cycle, is retrieved and a simple calculation is performed on such information by the processor portion 102 or the ECU arranged in the vehicle body to monitor the speed of the vehicle. This eliminates the need for a vehicle speed sensor that is arranged in the vehicle body in the prior art. This enables reduction in the production cost.

In the first to the fourth embodiments, the pressure sensor portion 101 does not have to detect the tire air pressure and may detect exhaust pressure, atmospheric pressure, and/or seating pressure. The pressure sensor portion 101 may have or be replaced by a noise sensor for detecting in-vehicle noise, ambient noise, engine noise, tire noise, and/or human voice; a heat sensor for detecting in-tire temperature, in-vehicle temperature, ambient temperature, engine temperature, battery temperature, radiator temperature, exhaust temperature, motor temperature, and exterior accessory temperature; an optical sensor for detecting ambient light amount, in-vehicle light amount, and/or headlight light amount; a movement sensor for detecting in-tire acceleration, the opening and closing of doors, windshield wiper movement, seat movement, and/or steering wheel operation; a vibration sensor for detecting tire vibrations, vehicle vibrations, door vibrations, frame vibrations, and/or seat vibrations; a rotation speed sensor for detecting tire rotation speed, engine speed, and/or motor speed; and/or an electromagnetic wave sensor for detecting ambient electromagnetic waves and in-vehicle electromagnetic waves.

FIFTH EXAMPLE

Figure 22:
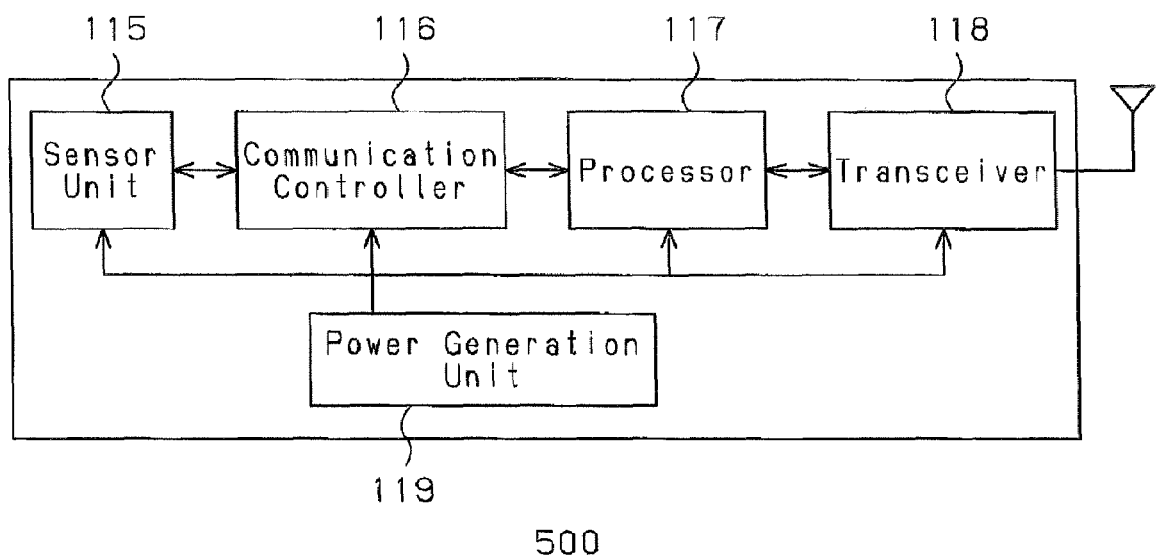
FIG. 22 is a block diagram of an electric device in a fifth example.

A communication device 500 using the electric power generator of the present invention will now be described with reference to FIG. 22.

The communication device 500 includes a sensor unit 115 for detecting in-tire air pressure, in-tire acceleration, tire vibrations, tire rotation speed, ambient light amount, vehicle vibrations, ambient temperature, and the like. The communication device 500 also includes a communication controller portion 116 for transmitting the detection results from the sensor unit 115 to the ECU and controlling the sensor unit 115 in accordance with information from the ECU, a processor portion 117 for processing the sensor signal from the sensor unit 115 and the signal from the ECU, a transceiver portion 118 for transmitting and receiving signals with a ECU through wireless communication (electromagnetic waves), and a power generation unit 119 for supplying power to activate at least one of the sensor unit 115, the communication controller portion 116, the processor portion 117, and the transceiver portion 118. One or a plurality of electric power generators 70 to 75 of the above embodiments for absorbing external vibrations in various directions and generating electric energy is arranged in the power generation unit 119. The transceiver portion 118 may be a transmitter portion that transmits wireless signals. The transceiver portion 118 may be a receiver portion that receives wireless signals.

The ECU is an example of an "electronic controller" of the present invention.

The sensor unit 115 detects ambient light amount (illuminance), noise level, amplitude of external vibrations, tire air pressure, tire rotation speed, and the like, and transmits the detection results to the communication controller portion 116. The communication controller portion 116 transmits the information detected in the sensor unit 115 to the ECU as signals and receives information from the ECU to determine the detection of the sensor unit 115 based on the information. The processor portion 117 performs a process for converting the output of the sensor unit 115 into a modulated signal, and demodulating the signal from the ECU received in the transceiver portion 118. The transceiver portion 118 transmits the modulated signal to the receiver arranged in the vehicle body through electromagnetic waves from the antenna and receives the signal from the ECU with the antenna. The power generation unit 119 absorbs external vibrations, converts the vibrations into electric energy, that is, performs power generation, and supplies the generated power to the sensor unit 115, the communication controller portion 116, the processor portion 117, and the transceiver portion 118.

As the vehicle travels, the power generation unit 119 generates power by converting the vibrations produced by the traveling vehicle into electric energy. The power generated by the power generation unit 119 is supplied to the sensor unit 115, the communication controller portion 116, the processor portion 117, and the transceiver portion 118. The transceiver portion 118 receives the modulated signal from the ECU with the antenna and transmits the modulated signal to the processor portion 117. The processor portion 117 demodulates the modulated signal and transmits the demodulated processing information to the communication controller portion 116. The communication controller portion 116 deciphers the processing information and performs an appropriate processing, such as detection with the sensor unit 115. The information (signal) detected by the sensor unit 115 is transmitted to the communication controller portion 116. To transmit information from the sensor unit 115 to the ECU, the communication controller portion 116 outputs the information to the processor portion 117. The processor portion 117 processes the information and converts the information into a modulated signal transmitted through electromagnetic waves. The modulated signal is transmitted to the transceiver portion 118 at a constant interval. The transceiver portion 118 receives the modulated signal sent from the processor portion 117 and transmits the signal through electromagnetic waves from the antenna. The ECU receives sensor information transmitted through electromagnetic waves.

The fifth example has the advantages described below.

(8) Efficient power generation is performed by absorbing all of the external vibrations in various directions. This stabilizes operation of the communication device and prevents erroneous operation of the communication device 500 that would be caused by decreases in power generation efficiency due when vibrations are produced in a random direction.

(9) The power generation unit is used in lieu of a battery. Thus, there is no need to be worried about the power consumption amount. Thus, the interval (frequency) for transmission of the detection result from the sensor unit to the ECU and the like may be increased (increase transmission frequency of the detected data). This enables the ECU and the like to recognize the state of the sensor unit in real time.

SIXTH EXAMPLE

Figure 23:
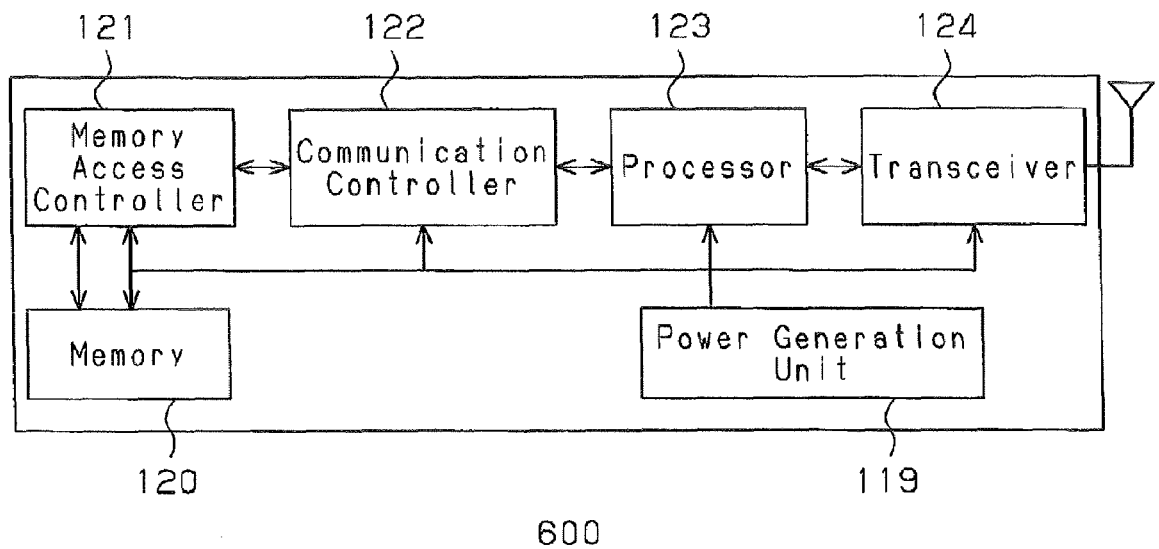
FIG. 23 is a block diagram of an electric device in a sixth example.

A memory type communication device 600 using the electric power generator of the present invention will now be described with reference to FIG. 23.

The communication device 600 includes a memory portion 120 for storing ID information, a memory access controller portion 121 for controlling access to the memory portion 120; a communication controller portion 122 for transmitting memory information from the memory portion 120 to a base station and executing write control on the memory portion 120 in accordance with the information from the base station, a processor portion 123 for processing the memory information from the memory portion 120 and the information from the base station, a transceiver portion 124 for exchanging signals with the base station through wireless communication (electromagnetic waves), and a power generation unit 119 for supplying power to activate at least one of the memory portion 120, the memory access controller portion 121, the communication controller portion 122, the processor portion 123, and the transceiver portion 124. One or a plurality of electric power generators 70 to 75 is arranged in the power generation unit 119. The transceiver portion 124 may be a transmitter portion that transmits wireless signals. The transceiver portion 124 may be a receiver portion that receives wireless signals.

The ID information is an example of "first information" in the present invention, and information from the base station is an example of "second information" in the present invention.

The memory portion 120 stores ID information such as tag information and personal data information transmitted from the base station. The memory access controller portion 121 controls access (writing and reading of data) to the memory portion 120 in accordance with a request from the communication controller portion 122. Accordingly, power is generated by converting the vibration energy generated by the power generation unit 119 into electric energy when the vehicle is traveling or when an object to which a radio frequency identification (RFID) tag is attached is moving.

The sixth example has the advantages described below.

(10) Efficient power generation is performed by absorbing all of the external vibrations in various directions. This stabilizes operation of the communication device and prevents erroneous operations of the communication device 600 that would be caused by a decrease in the power generation efficiency when vibrations in a random direction are produced.

SEVENTH EXAMPLE

Figure 24:
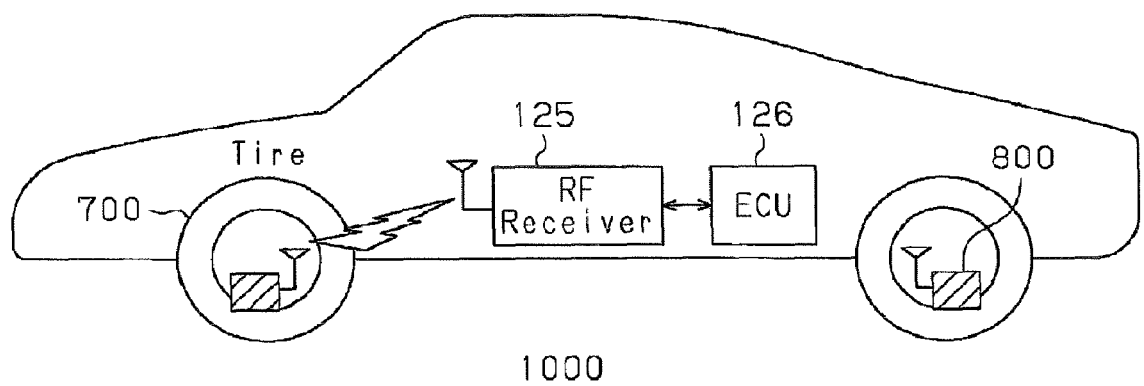
FIG. 24 is a schematic diagram of a communication system in a seventh example.

A tire air pressure sensor system 1000 using the electric power generator of the present invention will now be described with reference to FIG. 24.

The tire air pressure sensor system 1000 includes communication devices 700 and 800, which may be one of the tire air pressure sensor devices 100, 200, 300, and 400 described in the above examples, attached to locations remote from a vehicle body, for example, at least one tire of a vehicle. An RF receiver 125 is arranged in the vehicle body to receive an RF signal transmitted by the communication devices 700 and 800. A vehicle ECU 126 is connected to the RF receiver 125 to entirely or partially control the vehicle.

The communication devices 700 and 800 each includes at least one of the electric power generators 70 to 75 of the present invention for generating power by converting the vibration energy generated when the vehicle is traveling into electric energy. The communication devices 700 and 800 are operated by the power generated by the electric power generator 70 to 75 of the present invention. Each of the communication devices 700 and 800 detects the tire air pressure when the vehicle is traveling and transmits information indicating whether there is an abnormality to the RF receiver 125 at constant intervals. The RF receiver 125 receives the modulated signal transmitted by the communication devices 700 and 800 and transmits the signal to the vehicle ECU 126. A demodulation process is performed in either the receiver 125 or the vehicle ECU 126. The vehicle ECU 126 receives information on the tire air pressure from the RF receiver 125 and performs a process for notifying the driver of the vehicle of the state of the tire air pressure.

The electric power generator in the communication devices 700 and 800 generates power by converting the vibration energy produced when the vehicle travels into electric energy. The power generated by the electric power generator operates each electric circuit of the communication devices 700 and 800, and information of the tire air pressure such as abnormality of the air pressure is transmitted as a modulated signal to the RF receiver 125 at constant intervals. The RF receiver 125 receives the modulated signal, performs a demodulation process, and transmits the demodulated tire air pressure information to the vehicle ECU 126. The vehicle ECU 126 receives the air pressure information and performs an appropriate process such as output control of an alarm to the driver.

The tire air pressure sensor system 1000 of the seventh example has the advantages described below.

(11) In the tire air pressure sensor system 1000 that detects the state of the tire air pressure and issues alarms, the communication devices 700 and 800 including electric power generator of the present invention is attached to the tires. Since the communication devices 700 and 800 include the electric power generator of the present invention, periodic battery replacement that would be necessary when using the battery-driven type tire air pressure sensor of the prior art is not necessary (maintenance free).

(12) In the tire air pressure sensor system 1000, a transmitter does not have to be arranged in the vehicle body. This reduces production cost and power consumption.

(13) The power generation unit 107 (see FIG. 18) is applicable to external vibrations in every direction. This improves the power generation efficiency. Thus, the improvement of the operational margin increases the operation reliability.

EIGHTH EXAMPLE

Figure 25:
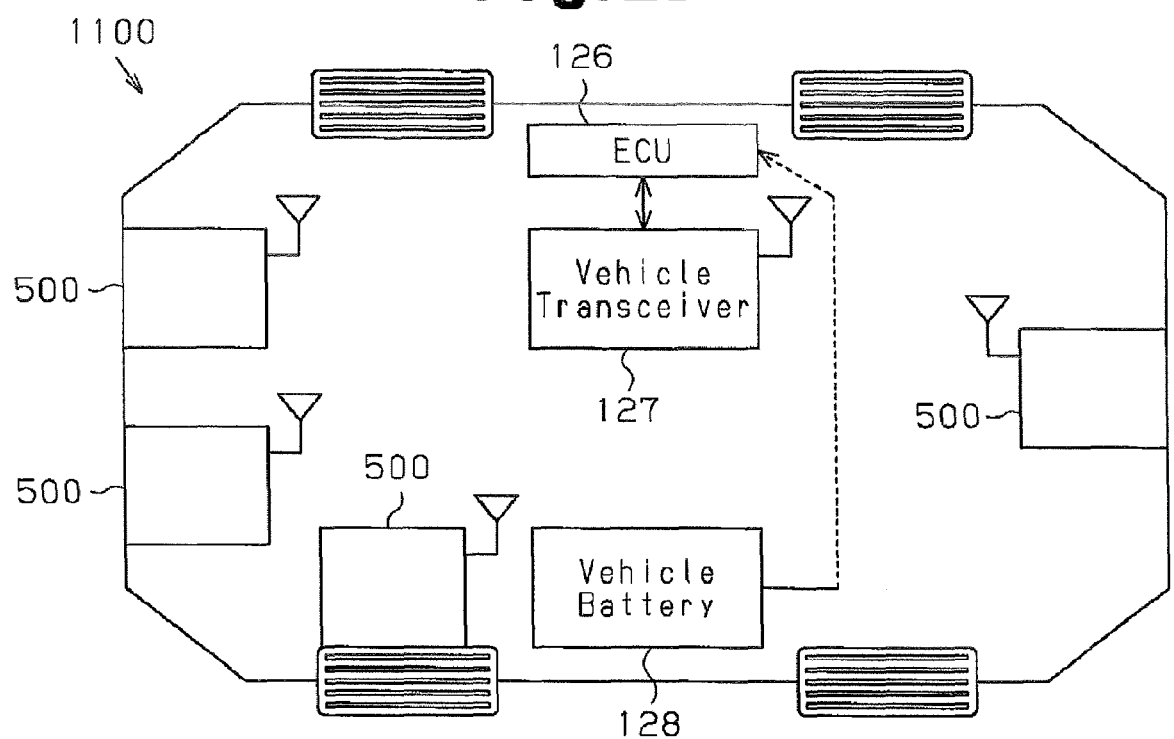
FIG. 25 is a schematic diagram of a communication system in an eighth example.

An in-vehicle network system 1100 using the electric power generator of the present invention will now be described with reference to FIG. 25.

The in-vehicle network system 1100 includes at least one communication device 500 of the fifth example, a vehicle transceiver 127 for receiving a transmission signal from the communication device 500 to the vehicle ECU 126 and transmitting a transmission signal from the vehicle ECU 126 to each communication device 500. The in-vehicle network system 1100 further includes a vehicle ECU 126, which is connected to the vehicle transceiver 127 to entirely (or partially) control the vehicle, and a battery 128, which supplies power to operate the vehicle ECU 126 and some sensor devices. In the seventh example, the battery 128 is used as the power supply of the vehicle ECU 126. However, the power generation units 107 and 119 of each example may be used as the power supply of the vehicle ECU 126 in lieu of the battery 128.

Each communication device 500 generates its own power when the vehicle travels. Sensor detection is performed in response to a request from the vehicle ECU 126 when the vehicle is traveling. The sensor information is transmitted to the vehicle ECU 126 at constant intervals. The vehicle transceiver 127 receives the modulated signal from each communication device 500 and transmits the modulated signal to the vehicle ECU 126. The vehicle transceiver 127 also transmits a request signal from the vehicle ECU 126 to each communication device 500 and operates (performs sensor detection with) each communication device 500. Either the vehicle transceiver 127 or the vehicle ECU 126 performs a demodulation process when receiving a signal and a modulation process when transmitting a signal. The vehicle ECU 126 requests each communication device 500 for sensor detection when necessary, receives information of the sensor detection from each communication device 500, and performs a process for notifying the vehicle driver of the detection result and controlling normal operation of the vehicle.

When the vehicle is traveling, the power generation unit in the electric power generator 500 converts the vibration energy produced by the traveling vehicle into electric energy and generates power. When the vehicle starts to travel, to perform normal vehicle operation, the vehicle ECU 126 transmits a request signal from the vehicle transceiver 127 to each communication device 500 in the vehicle body to collect information from each communication device 500. Each communication device 500 receives the signal from the vehicle ECU 126 and sends back the result of the requested sensor detection to the vehicle transceiver 127 as a signal. The vehicle transceiver 127 receives the sent back signal and then transmits the signal to the vehicle ECU 126. The vehicle ECU 126 receives the sensor detection information from each communication device 500, performs a process for transmitting the detection result to the vehicle driver, and executes control for performing normal operation of the vehicle.

The in-vehicle network system 1100 of the eighth example has the advantage described below.

(14) Each communication device 500 generates its own power in a self-sufficient manner and does not have to be connected to the vehicle by a power supply line. This enables each communication device 500 to transmit and receive information with the vehicle ECU 126 through wireless communication, and signal lines do not have to connect the ECU 126 to the vehicle. Therefore, signal lines and power supply lines (wire harness) for wired communication are not necessary as in the prior art system. Since wire harnesses do not have to be laid out in the vehicle, the production cost is reduced. Further, the elimination of the wire harnesses decreases weight and improves fuel consumption.

NINTH EXAMPLE

Figure 26A:
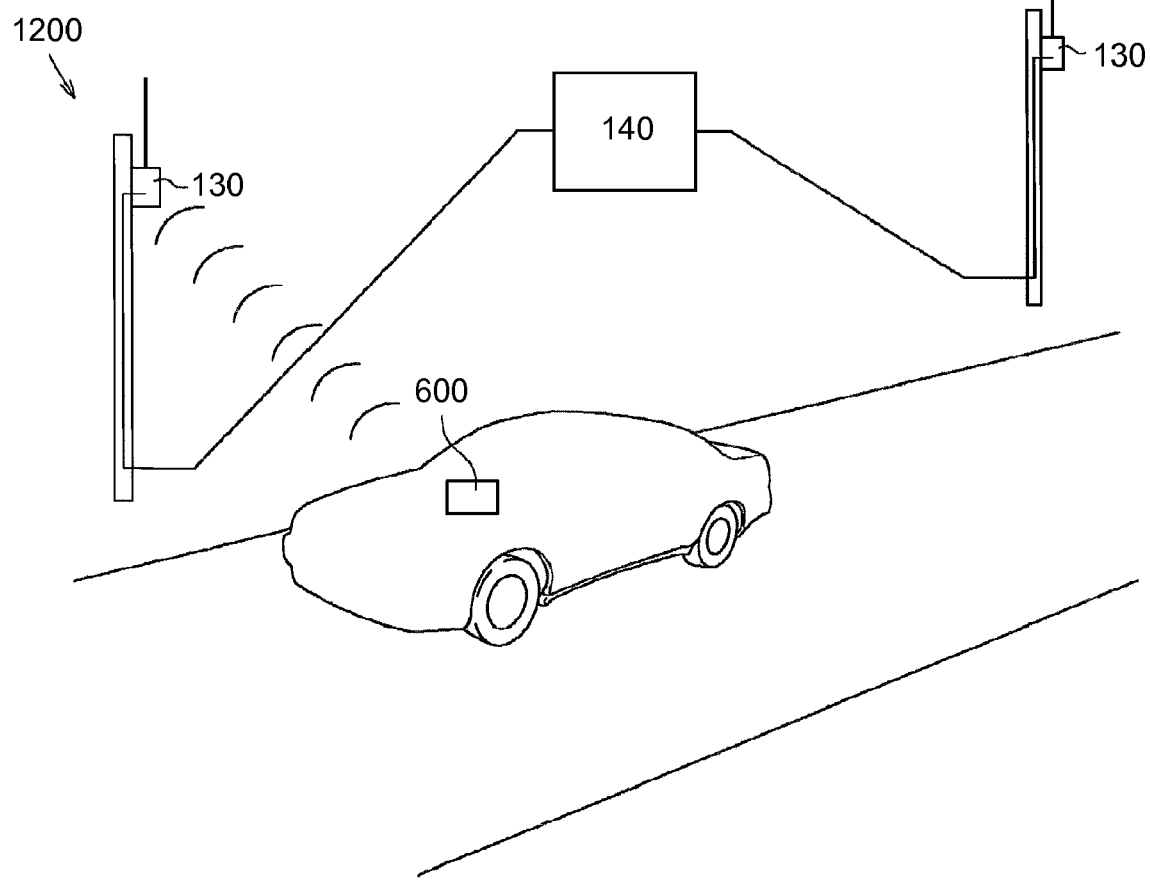
FIG. 26A is a schematic diagram of a communication system in a ninth example.

A traffic information network system 1200 using the electric power generator of the present invention will now be described with reference to FIG. 26A.

The traffic information network system 1200 includes the communication device 600 of the sixth example and base stations 130 for exchanging information with the communication device 600. The base stations 130 may be connected to an information processor 140. The information processor 140 identifies the vehicle from the signals exchanged between the communication device 600 and the base stations 130.

Figure 26B:
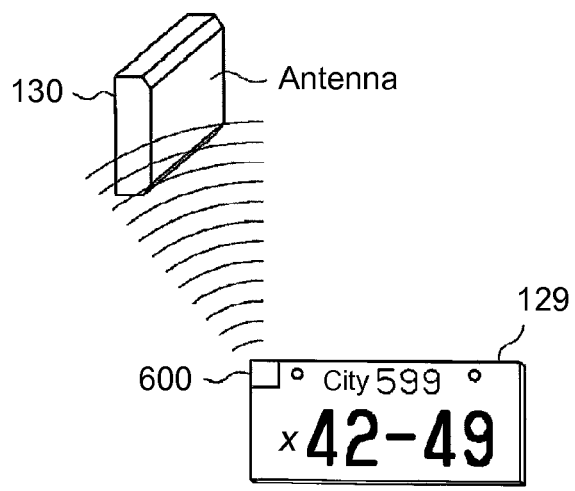
FIG. 26B is a schematic diagram of the communication system of the ninth example.

FIG. 26B shows an electronic license plate system (so-called smart plate) as one example of the traffic information network system 1200 The communication device 600 is attached to a license plate 129 of a vehicle. ID information such as the vehicle number is read from or written to a memory portion 120 (see FIG. 23) of the communication device 600. The communication device 600 generates its own operation power as the vehicle travels. In response to a request from the base station 130 of the electronic license plate system when the vehicle is traveling, ID information such as the plate number is transmitted to the base station 130. When necessary, information transmitted from the base station 130 is stored in the memory portion 120 (see FIG. 23). The base station 130 requests the communication device 600, which is attached to the license plate of each vehicle, for the ID information when necessary to recognize the ID information of the vehicle. In accordance with the recognized ID information or irrespective of the ID information, the communication device 600 may be requested to store different information.

When the vehicle travels, the power generation unit 119 (see FIG. 23) of the communication device 600 generates power by converting the vibration energy produced by the traveling vehicle into electric energy. The base stations 130 are arranged at predetermined locations on a road. Whenever the vehicle passes by such a location, the ID information of the vehicle is recognized and an appropriate process is performed. For example, the plate number or the like is read as ID information and checked. The checked information is then immediately transmitted to a management server or the like. In order to recognize the ID information, the base station 130 transmits an ID information request signal to the communication device 600 attached to the license plate 129. In response to the signal, the communication device 600 reads the ID information from the memory portion 120 (see FIG. 23) and sends the information back to the base station 130. In this manner, the electronic license plate system may monitor the locations of automobiles and buses.

The application of the communication device 600 is not limited to an electronic license plate system and may be applied to a traffic information network system 1200 such as an electronic toll collection system (ETC), a parking garage management system, and a logistics management system. A parking garage management system may manage the entering time, exiting time, and parking location of a vehicle incorporating the communication device 600. A logistics management system may monitor the location of a cargo vehicle incorporating the communication device.

The traffic information network system 1200 of the ninth example has the advantage described below.

(15) The communication device 600 generates it own operation power. This eliminates the need for a battery, and maintenance such as battery replacement is not necessary. Thus, tampering of the ID information written to the communication device 600 and leakage of personal information through unauthorized ID information reading that may be performed when the battery is replaced are prevented.

The first to ninth examples may be modified as described below.

(a) In the first to the ninth examples, the electric power generators 70 to 75 generate power using vibrations of the vehicle. However, vibrations or motions produced by objects other than a vehicle may be used to generate power. For example, the rotation of a tire, the vibration of hands, waves of water (ocean), vibrations of buildings and machines, noise such as the human voice may be used. The electric power generators 70 to 75 of the first to ninth examples may be incorporated in various electrical devices, such as a watch, a thermometer, a pedometer, a remote controller, a portable audio device, a portable keyless entry device, a hearing aid, a pacemaker, a laser pointer, an electric toothbrush, a sensor, an electronic book device, a mobile phone, a digital camera, a game machine, a refrigerator, a washing machine, a dish drier, a vessel, and a buoy.

(b) The tire air pressure sensor is used as an example of the communication device in the first to ninth examples. However, the communication device may also be applied to various sensors such as a temperature sensor and a transmitter. The electric power generator 70 to 75 of the present invention may be used as the power supply for electric devices other than the tire air pressure sensor.

(c) The type of memory is not specified in the first to the ninth examples, and various types of memory including a ROM and a RAM are applicable.

The technical concepts of the present invention that are understood from the above embodiments and examples will hereafter be described.

[Technical Concept 1] An electric power generator comprising:
 a first electrode; and
 a second electrode spaced from the first electrode;
 wherein at least one of the first electrode and the second electrode is movable in response to vibration along a first axis on a plane, vibration along a second axis on the plane, with the second axis differing from the first axis, and vibration along a third axis on a plane that differs from the plane, with the third axis intersecting the first axis and the second axis.

[Technical Concept 2] The electric power generator according to technical concept 1, wherein an overlapping area of the first electrode and the second electrode is changed when at least either one of the first electrode and the second electrode moves.

[Technical Concept 3] The electric power generator according to technical concept 1, wherein:

the first electrode and the second electrode are substantially parallel to each other; and at least either one of the first electrode and the second electrode reciprocates along the first axis regardless of the direction of vibration.

[Technical Concept 4] An electric device comprising:

a plurality of electronic components; and the electric power generator according to technical concept 1 for generating power to partially or entirely activate the electronic components.

[Technical Concept 5] The electric device according to technical concept 4, wherein the electric device is a wireless communication device for generating and outputting a wireless signal.

[Technical Concept 6] The electric device according to technical concept 4, wherein the electric device is a wireless communication device for receiving and processing a wireless signal.

[Technical Concept 7] The electric device according to technical concept 4, wherein the electric device is a sensor.

[Technical Concept 8] The electric device according to technical concept 4, wherein the electric device is installed in a vehicle and generates power from vibrations of the vehicle.

[Technical Concept 9] The electric device according to technical concept 8, wherein the plurality of electric components include at least one of:

a sensor portion for detecting at least one of tire air pressure, in-tire temperature, in-tire acceleration, tire vibration, and tire rotation speed;

a processor portion for processing an electric signal;

a transmitter portion for transmitting a wireless signal;

a receiver portion for receiving a wireless signal; and a memory portion for storing data.

[Technical Concept 10] The electric device according to technical concept 8, wherein the electric device is an in-vehicle network system.

[Technical Concept 11] The electric device according to technical concept 8, wherein the electric device transmits and receives information with a base station of a traffic information network system.

[Technical Concept 12] A communication device comprising:

the electric power generator according to technical concept 1, wherein the electric power generator is attached to a tire or a wheel for a tire of a vehicle.

[Technical Concept 13] The communication device according to technical concept 12, wherein:

the communication device detects at least one of tire air pressure, in-tire temperature, in-tire acceleration, tire vibration, and tire rotation speed;

the communication device performs wireless communication to output a result of the detection; and the electric power generator generates operational power partially or entirely required by the communication device.

[Technical Concept 14] An in-vehicle wireless device for an electronic license plate system comprising:

the electric power generator according to technical concept 1.

[Technical Concept 15] The in-vehicle wireless device according to technical concept 14, further comprising:

a memory portion;

a processor portion; and a transmitter portion;

wherein the electric power generator generates power for operating at least one of the memory portion, the processor portion, and the transmitter portion.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. An electric power generator comprising:

a first electrode; and a second electrode spaced from the first electrode;

wherein at least either one of the first electrode and the second electrode includes a film for carrying charge, and at least either one of the first electrode and the second electrode is movable along a first axis on a plane and along a second axis on the plane differing from the first axis.

2. The electric power generator according to claim 1, wherein an overlapping area of the first electrode and the second electrode is changed when at least either one of the first electrode and the second electrode moves.

3. The electric power generator according to claim 1, wherein the first electrode and the second electrode each include a plurality of linear or undulated strips.

4. The electric power generator according to claim 1, wherein the first electrode and the second electrode each include a plurality of zigzagged strips.

5. The electric power generator according to claim 1, wherein the first electrode and the second electrode each include a plurality of concentric strips.

6. The electric power generator according to claim 1, wherein the first electrode and the second electrode each include a plurality of pads laid out in a two-dimensional array.

7. The electric power generator according to claim 1, further comprising:

a fixed substrate including the first electrode;

a movable substrate facing toward the fixed substrate and including the second electrode; and an elastic member connected to the movable substrate for supporting the movable substrate and the second electrode in a manner enabling elastic movement along the first and second axes.

8. An electric device comprising:

a plurality of electronic components; and the electric power generator according to claim 1 for generating power to partially or entirely activate the electronic components.

9. The electric device according to claim 8, wherein the electric device is a wireless communication device for generating and outputting a wireless signal.

10. The electric device according to claim 8, wherein the electric device is a wireless communication device for receiving and processing a wireless signal.

11. The electric device according to claim 8, wherein the electric device is a sensor.

12. The electric device according to claim 8, wherein the electric device is installed in a vehicle and generates power from vibrations of the vehicle.

13. The electric device according to claim 12, wherein the plurality of electric components include at least one of:
- a sensor portion for detecting at least one of tire air pressure, in-tire temperature, in-tire acceleration, tire vibration, and tire rotation speed;
- a processor portion for processing an electric signal;
- a transmitter portion for transmitting a wireless signal;
- a receiver portion for receiving a wireless signal; and
- a memory portion for storing data.

14. The electric device according to claim 12, wherein the electric device is an in-vehicle network system.

15. The electric device according to claim 12, wherein the electric device transmits and receives information with a base station of a traffic information network system.

16. A communication device comprising:
- the electric power generator according to claim 1, wherein the electric power generator is attached to a tire or a wheel for a tire of a vehicle.

17. The communication device according to claim 16, wherein:
- the communication device detects at least one of tire air pressure, in-tire temperature, in-tire acceleration, tire vibration, and tire rotation speed;
- the communication device performs wireless communication to output a result of the detection; and
- the electric power generator generates operational power partially or entirely required by the communication device.

18. An in-vehicle wireless device for an electronic license plate system comprising:
- the electric power generator according to claim 1.

19. The in-vehicle wireless device according to claim 18, further comprising:
- a memory portion;
- a processor portion; and
- a transmitter portion;
- wherein the electric power generator generates power for operating at least one of the memory portion, the processor portion, and the transmitter portion.

* * * * *